(12) United States Patent
Tagawa et al.

(10) Patent No.: US 7,805,617 B2
(45) Date of Patent: *Sep. 28, 2010

(54) DIGITAL DATA RECORDING APPARATUS, DIGITAL DATA RECORDING METHOD, AND COMPUTER-READABLE RECORDING MEDIUM

(75) Inventors: Kenji Tagawa, Katano (JP); Masataka Minami, Tsuna-gun (JP); Masayuki Kozuka, Neyagawa (JP)

(73) Assignee: Panasonic Corporation, Osaka (JP)

( * ) Notice: Subject to any disclaimer, the term of this patent is extended or adjusted under 35 U.S.C. 154(b) by 49 days.

This patent is subject to a terminal disclaimer.

(21) Appl. No.: 12/104,974

(22) Filed: Apr. 17, 2008

(65) Prior Publication Data

US 2008/0276101 A1  Nov. 6, 2008

Related U.S. Application Data

(60) Continuation of application No. 10/916,523, filed on Aug. 12, 2004, now Pat. No. 7,380,139, which is a division of application No. 09/358,820, filed on Jul. 22, 1999, now Pat. No. 6,834,348.

(30) Foreign Application Priority Data

Jul. 22, 1998 (JP) .................................. 10-206967
Oct. 12, 1998 (JP) .................................. 10-289831

(51) Int. Cl.
*G11B 20/00* (2006.01)
*G06F 11/30* (2006.01)

(52) U.S. Cl. ....................... 713/193; 380/277; 713/150; 726/26

(58) Field of Classification Search .................. 713/193
See application file for complete search history.

(56) References Cited

U.S. PATENT DOCUMENTS 4,853,962 A    8/1989   Brockman (Continued)

FOREIGN PATENT DOCUMENTS

DE         0 862 149         9/1998

(Continued)

OTHER PUBLICATIONS

Thomson, "SmartRight Technical white paper", Thomson, Version 1.7, Jan. 2003, entire document, http://www.smartright.org/images/SMR/content/SmartRight_tech_whitepaper_jan28.pdf.*

(Continued)

*Primary Examiner*—Edan Orgad
*Assistant Examiner*—Ronald Baum
(74) *Attorney, Agent, or Firm*—Wenderoth, Lind & Ponack, L.L.P.

(57) ABSTRACT

A data communication unit receives encrypted digital data via a network and records the digital data on a primary recording medium. The digital data, having been encrypted in different encryption methods according to the distributors, include attribute information indicating the encryption methods. The encryption method of the digital data is determined and the encrypted data is decrypted by an appropriate decryption unit. Identification information of a secondary recording medium or a playback apparatus is obtained according to whether the secondary recording medium is removable from the playback apparatus. A controller selects an encryption unit among a plurality of encryption units according to the obtained identification information. The selected encryption unit creates an encryption key according to the identification information and re-encrypts the digital data. A recording unit records the digital data on the secondary recording medium. An accounting unit charges according to accounting information in the attribute information.

8 Claims, 25 Drawing Sheets

DIGITAL DATA RECORDING APPARATUS

U.S. PATENT DOCUMENTS

| | | | |
|---|---|---|---|
| 5,109,413 A * | 4/1992 | Comerford et al. ............ | 705/54 |
| 5,144,659 A | 9/1992 | Jones | |
| 5,533,123 A | 7/1996 | Force et al. | |
| 5,666,412 A | 9/1997 | Handelman et al. | |
| 5,699,428 A | 12/1997 | McDonnal et al. | |
| 5,912,969 A | 6/1999 | Sasamoto et al. | |
| 6,052,780 A | 4/2000 | Glover | |
| 6,069,952 A * | 5/2000 | Saito et al. .................... | 705/57 |
| 6,081,785 A | 6/2000 | Oshima et al. | |
| 6,097,814 A | 8/2000 | Mochizuki | |
| 6,128,735 A | 10/2000 | Goldstein et al. | |
| 6,223,285 B1 | 4/2001 | Komuro et al. | |

FOREIGN PATENT DOCUMENTS

| | | |
|---|---|---|
| EP | 0 679 977 | 11/1995 |
| EP | 0 704 785 | 4/1996 |
| EP | 0 831 653 | 3/1998 |
| JP | 06-044122 | 2/1994 |
| JP | 07-225550 | 8/1995 |
| JP | 07249262 | 9/1995 |
| JP | 07/288762 | 10/1995 |
| JP | 07-295892 | 11/1995 |
| JP | 07-296508 | 11/1995 |
| JP | 08-006879 | 1/1996 |
| JP | 08-212198 | 8/1996 |
| JP | 08-214278 | 8/1996 |
| JP | 08-297638 | 11/1996 |
| JP | 8-339629 | 12/1996 |
| JP | 09-149023 | 6/1997 |
| JP | 10-150653 | 6/1998 |
| JP | 11-191266 | 7/1999 |
| JP | 7-272399 | 10/1999 |

OTHER PUBLICATIONS

U.S. Office Action issued Jul. 31, 2007 in U.S. Appl. No. 10/916,523.

U.S. Notice of Allowance issued Jan. 17, 2008 in U.S. Appl. No. 10/916,523.

European Search Report completed Aug. 30, 2001 for EP Application No. 99931449.

European Search Report completed Jul. 21, 2004 for EP Application No. 03012252.

* cited by examiner

FIG. 3

| | 301 | 302 | 303 | 304 |
|---|---|---|---|---|
| | TITLE | SINGER | TIME | PRICE |
| | Song1 | SingerA | 4'20" | ¥100 |
| | Song2 | SingerB | 3'53" | ¥50 |
| | Song3 | SingerC | 4'48" | ¥75 |
| | Song4 | SingerD | 4'06" | ¥100 |
| | ⋮ | ⋮ | ⋮ | ⋮ |
| | ⋮ | ⋮ | ⋮ | ⋮ |

FIG. 5

| TITLE ~301 | SINGER ~302 | TIME ~303 | PRICE(1) ~501 | PRICE(2) ~502 |
|---|---|---|---|---|
| Song1 | SingerA | 4'20" | ¥100 | ¥70 |
| Song2 | SingerB | 3'53" | ¥50 | ¥35 |
| Song3 | SingerC | 4'48" | ¥75 | ¥50 |
| Song4 | SingerD | 4'06" | ¥100 | ¥100 |
| ⋮ | ⋮ | ⋮ | ⋮ | ⋮ |
| ⋮ | ⋮ | ⋮ | ⋮ | ⋮ |

FIG. 9

| | 2201 | 2202 | 2203 | 2204 |
|---|---|---|---|---|
| | TITLE | TITLE CODE | SINGER | DATA SOURCE |
| | TITLE A | song01 | A | www. song/song01 |
| | TITLE B | song02 | B | www. song/song02 |
| | TITLE C | song03 | C | www. song/song03 |
| | TITLE D | song04 | D | www. song/song04 |
| | TITLE E | song05 | E | www. song/song05 |

FIG. 12

| TITLE | TITLE CODE | SINGER | DATA SOURCE | COPY CONTROL INFORMATION | PRICE |
|---|---|---|---|---|---|
| TITLE A | song01 | A | www.song/song01 | NO RECOPYING | ¥100 |
| TITLE B | song02 | B | www.song/song02 | NO LIMIT | ¥10 |
| TITLE C | song03 | C | www.song/song03 | NO RECOPYING | ¥0 |
| TITLE D | song04 | D | www.song/song04 | NO RECOPYING | ¥30 |
| TITLE E | song05 | E | www.song/song05 | COPYING TWICE | ¥10 |

FIG. 17

ATTRIBUTE INFORMATION 3201

| TITLE | PERFORMER | TITLE CODE | RECORDING CHARGE | CHARGE PER REPRODUCTION | MAXIMUM NUMBER OF REPRODUCING | ENCRYPTION CONDITION | COPY PERMISSION | ... |
|---|---|---|---|---|---|---|---|---|
| | 3202 | 3203 | 3204 | 3205 | 3206 | 3207 | 3208 | 3209 |
| MUSIC A | a | song01 | ¥100 | ¥0.5 | 100回 | ENCRYPTED | ONLY ONCE | ... |
| MUSIC B | b | song02 | ¥10 | ¥0 | NO LIMIT | NOT ENCRYPTED | PERMITTED | ... |
| MUSIC C | c | song03 | ¥0 | ¥1 | 50回 | ENCRYPTED | ONLY ONCE | ... |
| MUSIC D | d | song04 | ¥30 | ¥5 | 50回 | ENCRYPTED | ONLY ONCE | ... |
| MUSIC E | e | song05 | ¥10 | ¥0 | 10回 | NOT ENCRYPTED | PERMITTED | ... |

FIG. 18

MANAGEMENT INFORMATION 3301

| TITLE CODE (3204) | RECORDING START ADDRESS (3302) | RECORDING END ADDRESS (3303) |
|---|---|---|
| song01 | 00320 | 00933 |
| song02 | 14902 | 15172 |
| song03 | 13085 | 13994 |
| song04 | 50870 | 51825 |
| song05 | 58349 | 58783 |

FIG. 23

ATTRIBUTE INFORMATION 3801

| TITLE | PERFOR-MER | TITLE CODE | PRIMARY RECORDING CHARGE | SECONDARY RECORDING CHARGE | CHARGE PER REPRODUCTION | MAXIMUM NUMBER OF REPRODUCING | ENCRYPTION CONDITION | COPY PERMISSION (PRIMARY) | COPY PERMISSION (SECONDARY) | ... |
|---|---|---|---|---|---|---|---|---|---|---|
| MUSIC A | a | song01 | ¥0 | ¥100 | ¥0.5 | 100回 | ENCRYPTED | ONLY ONCE | ONLY ONCE | ... |
| MUSIC B | b | song02 | ¥10 | ¥10 | ¥0 | NO LIMIT | NOT ENCRYPTED | PERMITTED | PERMITTED | ... |
| MUSIC C | c | song03 | ¥0 | ¥0 | ¥1 | 50回 | ENCRYPTED | ONLY ONCE | ONLY ONCE | ... |
| MUSIC D | d | song04 | ¥0 | ¥30 | ¥5 | 50回 | ENCRYPTED | ONLY ONCE | ONLY ONCE | ... |
| MUSIC E | e | song05 | — | — | — | — | NOT ENCRYPTED | NOT PERMITTED | NOT PERMITTED | ... |

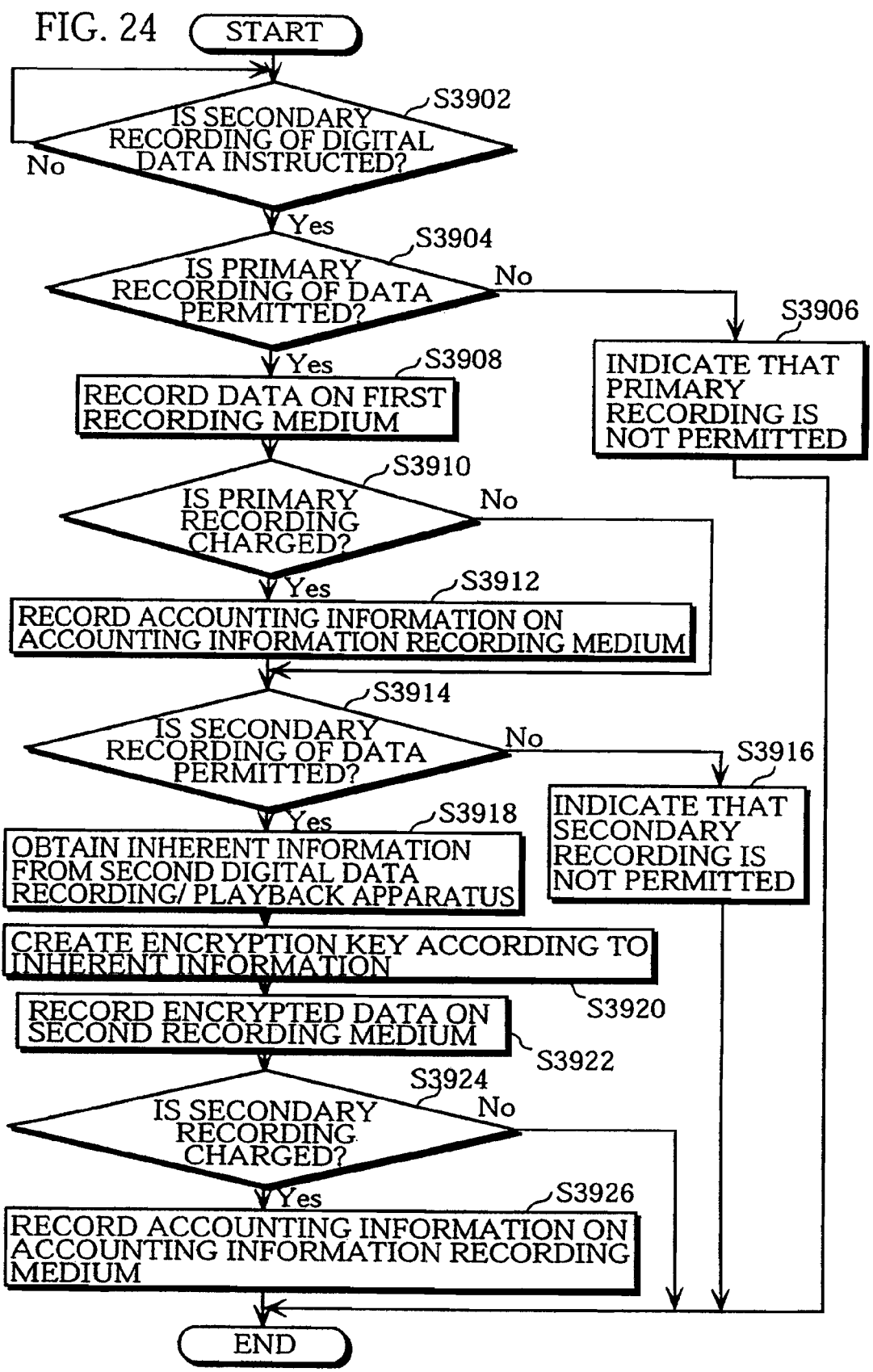

FIG. 25

ATTRIBUTE INFORMATION 31001

| TITLE CODE | ... | MEDIUM ID 31003 | APPARATUS ID 31004 | SECONDARY RECORDING CHARGE 31002 | ... |
| --- | --- | --- | --- | --- | --- |
| | | | | MEDIUM ID + APPARATUS ID 31005 | |
| ... | ... | ... | ... | ... | ... |
| song01 | ... | ¥100 | ¥10 | ¥10 | ... |
| song02 | ... | ¥10 | ¥1 | ¥1 | ... |
| song03 | ... | ¥0 | ¥0 | ¥0 | ... |
| song04 | ... | ¥30 | ¥3 | ¥3 | ... |
| song05 | ... | ¥10 | ¥1 | ¥1 | ... |
| ... | ... | ... | ... | ... | ... |

DIGITAL DATA RECORDING APPARATUS, DIGITAL DATA RECORDING METHOD, AND COMPUTER-READABLE RECORDING MEDIUM

This application is a continuation application of Ser. No. 10/916,523, filed Aug. 12, 2004 now U.S. Pat. No. 7,380,139, which is a divisional application of Ser. No. 09/358,820, filed Jul. 22, 1999, which is now U.S. Pat. No. 6,834,348.

This application is based on application Ser. Nos. 10-206967 and 10-289831 filed in Japan, the contents of which are hereby incorporated by reference.

BACKGROUND OF THE INVENTION

1. Field of the Invention

The present invention relates to a digital data recording apparatus, a digital data recording method, and a computer-readable recording medium for protecting the copyrights of digital data.

2. Description of the Related Art

Thanks to the recent widespread use of the Internet, distribution of music with so-called EC (Electronic Commerce) has been developed, in which desired music data is downloaded from a homepage using a PC (Personal Computer) and the bill for the downloaded music data is charged to a credit card, for instance. The widespread use of music distribution through the Internet using the EC (herein after referred to "electronic music distribution" in this specification) would reduce the necessity for consumers to go to record stores and might drastically change the distribution of music, which has been mainly distributed by CDs (Compact Discs).

However, many people listen to music not only at home but also on their way to the office, school, home, and in a car by using a portable playback apparatus and the like. In these cases, music data must be recorded on a portable medium such as an MD (Mini Disc).

Regarding electronic music distribution, delivery companies adopt a variety of encryption methods to protect copyrights. More specifically, a different optimum encryption method is adopted according to the manufacturing company, the distribution route, the usage pattern, and the like. Under these circumstances, when music data that has been distributed through an electronic music distribution system is recorded on an MD, the playback apparatus is required to decode the music data on the MD according to the adopted encryption method. As a result, the playback apparatus is bulky, expensive, and not useful for users.

It is useful for users when music data that has been distributed through an electronic music distribution system is decoded at the time of recording on an MD since playback apparatuses can be inexpensive.

In this case, however, unauthorized duplication of music data is encouraged, and as a result, the copyright of the music data cannot be fully protected.

SUMMARY OF THE INVENTION

It is therefore an object of the present invention to provide a digital data recording apparatus, a digital data recording method, and a computer-readable recording medium for protecting copyrights and reproducing music data that are recorded on a recording medium with an inexpensive digital data playback apparatus.

The above-mentioned object may be achieved by a digital data recording apparatus for recording digital data on a recording medium, where the digital data recording apparatus may include: a communication unit for receiving encrypted digital data via a digital network; a decryption unit for decrypting the encrypted digital data that has been received by the communication unit; an encryption unit including a plurality of encryption sub-units which each re-encrypt decrypted digital data in encryption methods that have different security levels; a recording unit for recording digital data that has been re-encrypted by the encryption unit on the recording medium; and a controller for controlling the decryption unit and the encryption unit; wherein the controller causes one of the plurality of encryption sub-units to re-encrypt the digital data that has been decrypted by the decryption unit.

As a result, it is possible to record digital data that has been re-encrypted by the encryption unit and that can be easily reproduced by the playback apparatus. It is also possible to protect the copyright of the digital data since the digital data has been re-encrypted.

The above-mentioned object may be also achieved by the digital data recording apparatus, wherein the digital data that has been recorded on the recording medium is reproduced by a playback apparatus. Further, the encryption unit includes a first encryption sub-unit for re-encrypting digital data by using an encryption key that has been created according to identification information of the recording medium, and a second encryption sub-unit for re-encrypting digital data by using an encryption key that has been created according to identification information of the playback apparatus. The controller determines whether the recording medium is removable from the playback apparatus, causes the first encryption sub-unit to re-encrypt the decrypted digital data when the recording medium is removable from the playback apparatus, and has the second encryption sub-unit re-encrypt the decrypted digital data when the recording medium is not removable from the playback apparatus.

As a result, when the digital data on a recording medium is reproduced by a playback apparatus, the digital data may be reproduced by re-encrypting the digital data by using an encryption key that has been created according to the identification information of the recording medium. On the other hand, when the digital data on a recording medium is reproduced by a specific playback apparatus, the digital data may be reproduced by the specific playback apparatus by re-encrypting the digital data by using an encryption key that has been created according to the identification information of the specific playback apparatus.

The above-mentioned object may be also achieved by the digital data recording apparatus which may also include an accounting unit for conducting an accounting process via the digital network, wherein the controller determines an accounting value according to an encryption sub-unit that has re-encrypted the decrypted digital data, and controls the accounting unit so that the controller conducts the accounting process according to the determined accounting value.

As a result, it is possible to select an encryption sub-unit from among the plurality of encryption sub-units that re-encrypt digital data in encryption methods having different security levels, and it is possible to pay a charge according to the selected encryption sub-unit.

The above-mentioned object may be also achieved by the digital data recording apparatus, wherein the controller prohibits the decryption unit from decrypting the encrypted digital data when the encryption unit fails to create any encryption key.

As a result, an unnecessary decryption of digital data may be prevented when the encryption unit fails to create any encryption key.

The above-mentioned object may be also achieved by the digital data recording apparatus, wherein the security levels of the encryption methods in which the plurality of encryption sub-units re-encrypt decrypted digital data are lower than security levels of encryption methods in which encrypted digital data that are to be received by the communication unit have been encrypted.

As a result, a playback apparatus may easily reproduce digital data, thereby leading to a less expensive playback apparatus.

The above-mentioned object may be also achieved by the digital data recording apparatus, wherein: the encrypted digital data that is received by the communication unit has been encrypted in one of the encryption sub-systems having different security levels and the encrypted digital data includes attribute information that indicates the encryption system; the decryption unit includes a plurality of decryption sub-units that decrypt the encrypted digital data that have been encrypted in the encryption systems; and the controller determines the encryption system in which the encrypted digital data has been encrypted according to the attribute information, and controls the decryption unit so that a decryption sub-unit from among the plurality of decryption sub-units corresponding to the determined encryption system decrypts the encrypted digital data.

As a result, even when received digital data have been encrypted in encryption systems having different security levels, it is possible to decrypt the digital data by selecting a decryption sub-unit according to the encryption system in which the digital data has been encrypted.

The above-mentioned object may be also achieved by the digital data recording apparatus, which may further include an accounting unit for conducting an accounting process via the digital network, wherein the controller determines an accounting value according to a decryption sub-unit that has decrypted the encrypted digital data and an encryption sub-unit that has re-encrypted the decrypted digital data, and the controller controls the accounting unit so that the controller conducts the accounting process according to the determined accounting value.

As a result, it is possible to pay a charge according to the decryption and re-encryption of digital data and to protect the copyright.

The above-mentioned object may be also achieved by a digital data recording method of recording digital data on a recording medium, where the digital data recording method may include: a communication step for receiving encrypted digital data via a digital network; a decryption step for decrypting the encrypted digital data that has been received at the communication step; an encryption step for re-encrypting decrypted digital data in one of a plurality of encryption systems having different security levels; and a recording step for recording digital data that has been re-encrypted at the encryption step on the recording medium.

As a result, it is possible to record digital data on a recording medium that has been re-encrypted in an encryption system so that the digital data is easily reproduced by a playback apparatus. In addition, since the digital data is re-encrypted, the copyright of the digital data may be protected.

The above-mentioned object may be also achieved by the digital data recording method, wherein the encrypted digital data that is received at the communication step has been encrypted in an encryption system among a plurality of encryption systems having different security levels, and where the encrypted digital data includes attribute information that indicates the encryption system. In addition, the digital data recording method may further comprise a determining step for determining one of the plurality of encryption systems according to the attribute information, wherein the decryption step decrypts the encrypted digital data according to the determination of the determining step.

As a result, digital data that has been recorded on a recording medium may be reproduced by any playback apparatus or only by a specific playback apparatus.

The above-mentioned object may be also achieved by a computer-readable recording medium that is applied to a digital data recording apparatus for recording digital data on a first recording medium, where the computer-readable recording medium stores a program that causes a computer to execute: a communication step for receiving encrypted digital data via a digital network; a decryption step for decrypting the encrypted digital data that has been received at the communication step; an encryption step for re-encrypting decrypted digital data in an encryption system among a plurality of plurality of encryption systems having different security levels; and a recording step for recording digital data that has been re-encrypted at the encryption step on the recording medium.

As a result, it is possible to record digital data on a recording medium that has been re-encrypted in an encryption system so that the digital data is easily reproduced by a playback apparatus. In addition, it is possible to protect copyrights by using the recording medium in a digital data recording apparatus that does not have a function to protect copyrights.

The above-mentioned object may be also achieved by the computer-readable recording medium, wherein the encrypted digital data that is received at the communication step has been encrypted in an encryption system among the plurality of encryption systems having different security levels, and where the encrypted digital data includes attribute information that indicates the encryption system. In addition, the digital data recording method may further include a determining step for determining an encryption system among the plurality of encryption systems according to the attribute information.

As a result, it is possible to reproduce digital data that has been recorded on the first recording medium by any playback apparatus or by a specific apparatus.

BRIEF DESCRIPTION OF THE DRAWINGS

These and other objects, advantages and features of the present invention will become apparent from the following description when taken in conjunction with the accompanying drawings, which illustrate specific embodiments of the present invention. In the Drawings:

FIG. 3 shows an example of a display screen of a home page for purchasing music data according to the first embodiment of the present invention;

FIG. 5 shows an example of a display screen of a home page for purchasing music data according to the first embodiment of the present invention;

FIG. 9 is an example of information that is displayed on a display unit when digital signals provided by the information provider are recorded in the second embodiment;

FIG. 12 shows the attribute information of data in the third embodiment;

FIG. 17 is an example of attribute information;

FIG. 18 shows an example of management information;

FIG. 23 shows an example of the data structure of attribute information that is attached to digital data when the digital data is transmitted in seventh embodiment;

FIG. 24 is a flowchart showing operations in seventh embodiment;

FIG. 25 shows an example of the data structure of attribute information that is attached to digital data when transmitted in another example of the seventh embodiment.

DETAILED DESCRIPTION OF THE INVENTION

A detailed explanation of the preferred embodiments of a digital data recording apparatus according to the present invention will be given with reference to the drawings.

First Embodiment

Figure 1:
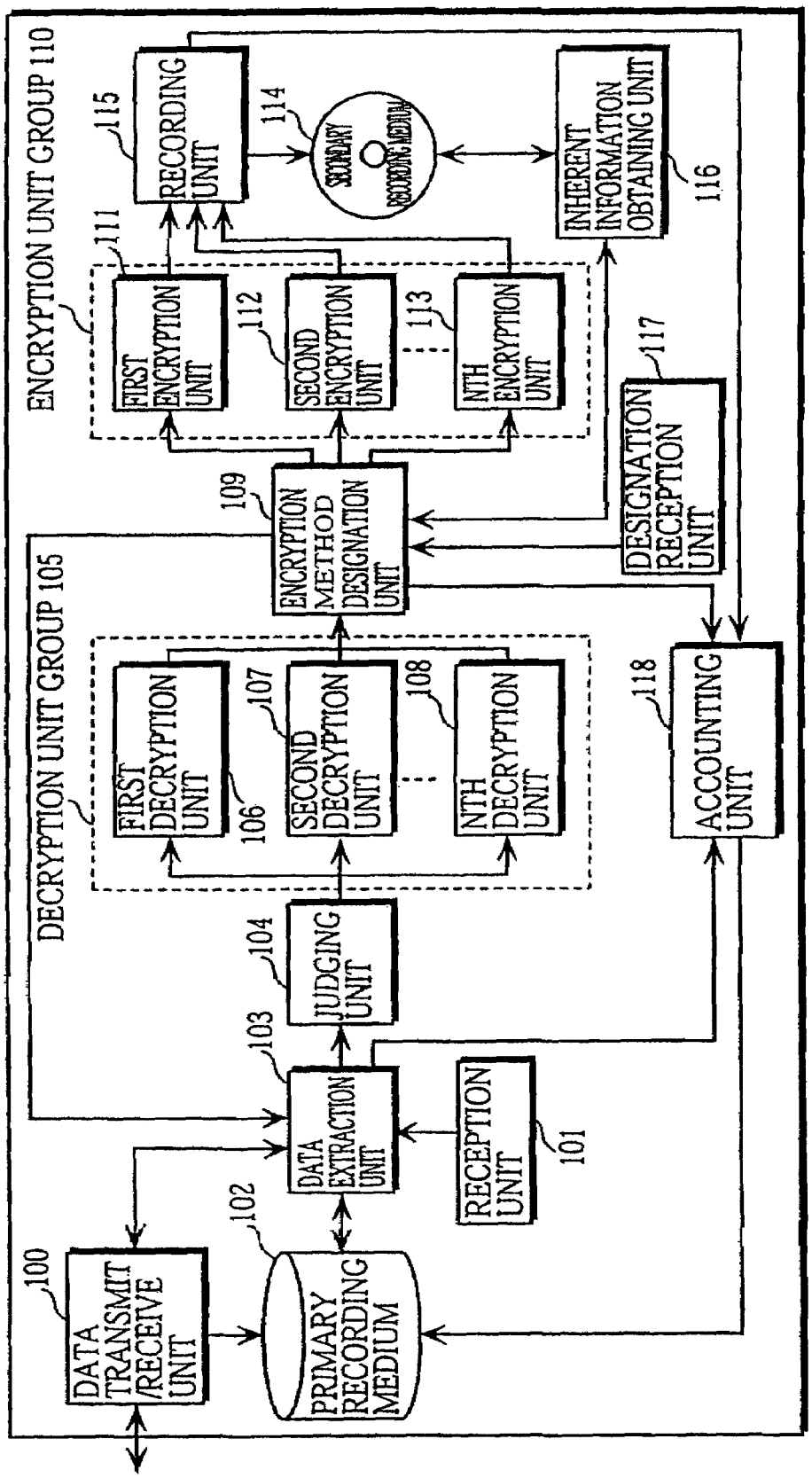
FIG. 1 shows the structure of a digital data recording apparatus according to a first embodiment of the present invention.

FIG. 1 shows the structure of a digital data recording apparatus according to a first embodiment of the present invention. The digital data recording apparatus includes a data transmit/receive unit (communication unit) 100, a reception unit 101, a primary recording medium 102, a data extraction unit 103, a judging unit 104, a decryption unit group 105, an encryption method designation unit (controller) 109, an encryption unit group 110, a secondary recording medium 114, a recording unit 115, an inherent information obtaining unit 116, a designation reception unit 117, and an accounting unit 118.

Figure 2:
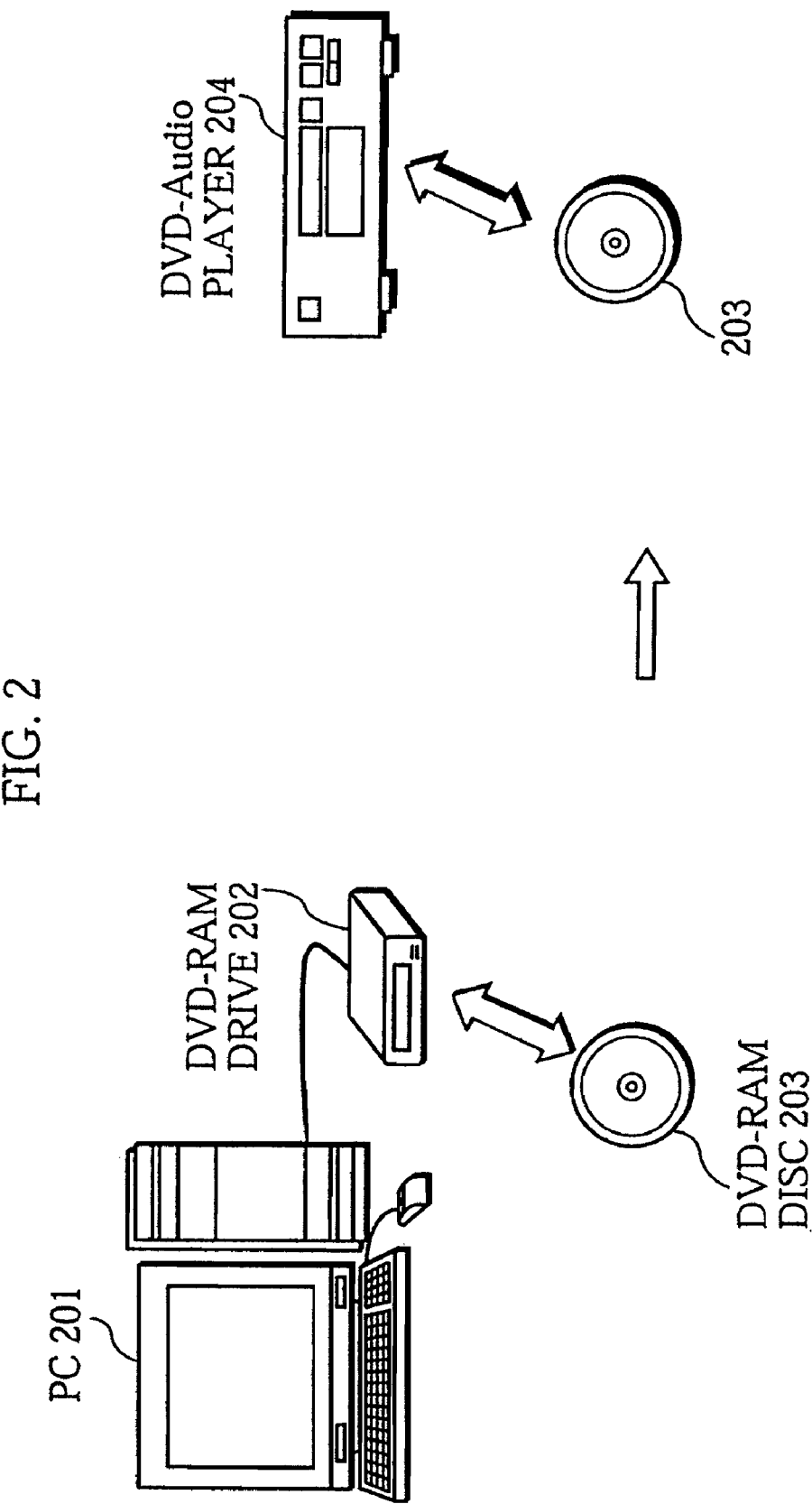
FIG. 2 is an external view of the hardware configuration of the first embodiment of the present invention, and an external view of a playback apparatus of a recording medium according to the first embodiment of the present invention.

Note that each element of the digital data recording apparatus, except for the secondary recording medium 114 and the recording unit 115, is generally realized by a PC (Personal Computer) 201, as shown in FIG. 2. The recording unit 115 is realized by, for instance, a DVD (Digital Versatile Disc)-RAM drive 202, and the secondary recording medium 114 is realized by a DVD-RAM disc 203.

The digital data recording apparatus receives music data, i.e., encrypted digital data that is distributed through the Internet, and downloads the received music data in the primary recording medium 102. Then, the digital data recording apparatus decodes the digital data in the decryption unit group 105, re-encrypts the decoded digital data in the encryption unit group 110, and records the re-encrypted digital data in the secondary recording medium 114.

Note that although an explanation of electronic music distribution will be given in the first embodiment, the type of distributed digital data is not limited to music. Distributed digital data may be video data, character data, or the combination of those kinds of data.

The data transmit/receive unit 100 is a communication unit which is realized by a modem and a control software, and the data transmit/receive unit 100 is connected to the host computer (not illustrated) of an information provider through a telephone line. When the data transmit/receive unit 100 is informed of the purchase requirement of a piece of music that has been received by the reception unit 101 via the data extraction unit 103, the data transmit/receive unit 100 transmits the purchase requirement to the host computer. The data transmit/receive unit 100 downloads music data from the host computer according to the purchase requirement via the Internet, and records the downloaded music data in the primary recording medium. Meanwhile, the data transmit/receive unit 100 transmits accounting information to the host computer that has been generated at the time the music is purchased.

Next, an explanation of information that is provided by the information provider will be given. The information provider sets up a site, i.e., a homepage for the sale of music data, to provide information such as music titles and prices that are necessary for users to purchase music data and which may arouse the interest of users. Users purchase desired music data according to the information that is provided by the information provider.

FIG. 3 shows an example of a homepage for the sale of music data provided by an information provider. The information includes titles 301, singers 302, times 303, and prices 304. A title 301 and a singer 302 show the title and singer of one piece of music data. A time 303 shows the time required to record (play back) one piece of music data, and a price 304 shows the selling price of one piece of music data. A user selects a piece of music according to the information, and the user informs the data transmit/receive unit 100 of a purchase requirement through the reception unit 101. Needless to say, the information provided by the information provider is not limited to character information as shown in FIG. 3. For example, the information may be images such as jacket pictures and music data for test-listening.

The reception unit 101 includes a keyboard and a mouse, and receives a purchase requirement from the user who has watched the information shown in FIG. 3 on the display screen of the PC. The received purchase requirement is transferred to the data transmit/receive unit 100 via the data extraction unit 103.

The primary recording medium 102 is realized by a hard disk in the PC, and stores the music data, i.e., the encrypted digital data that has been received by the data transmit/receive unit 100. Meanwhile, in a secure area on the primary recording medium 102, encrypted accounting information, for instance, is recorded by the accounting unit 118 when the downloaded music data is recorded on the secondary recording medium 114.

Figure 4:
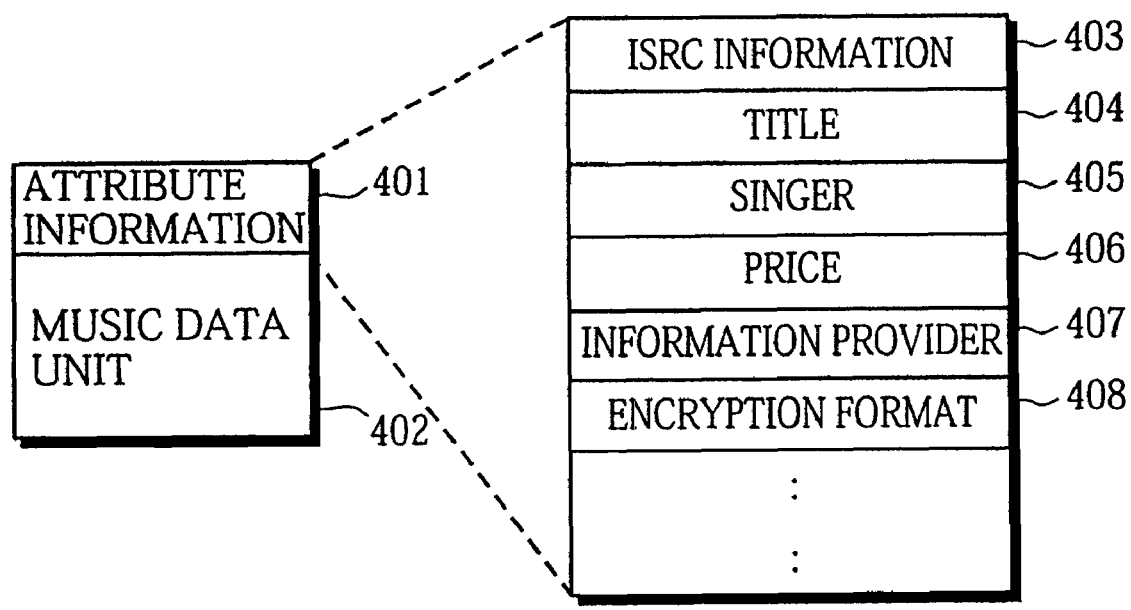
FIG. 4 shows an example of the data structure of music data that is downloaded on a primary recording medium according to the first embodiment of the present invention.

FIG. 4 shows an example of the data structure of downloaded music data that is stored in the primary recording medium 102, i.e., music data that the information provider provides. Music data that is provided by the information provider is mainly composed of attribute information 401 including the title, singer and the price of the music data, and a music data unit 402 that is the music data itself.

The attribute information 401 includes ISRC (International Standard Recording Code) information 403, a title 404, a singer 405, a price 406, an information provider 407, and an encryption format 408. An explanation of the attribute information 401 will be given below.

The ISRC information 403 is specific information assigned to each piece of music data, and is composed of a country code (two ASCII (American Standard Code for International Interchange) characters), an owner code (three ASCII characters), a recording year (two-digit numbers), and a serial number (five-digit numbers). The title 404 is character information showing the title of the music data, and the singer 405 is character information showing the singer of the music data. The price 406 is information showing the monetary amount for the music data. Note that the price 406 shows the amount that is charged when the downloaded music data is recorded on the secondary recording medium 114 by using the digital data recording apparatus in the first embodiment.

The information provider 407 is information showing the provider or the copyrighter of the music data, i.e., the information provider 407 shows the recipient of the amount that is charged when the user records the music data by using the digital data recording apparatus.

The encryption format 408 is information showing the encryption format in which the downloaded music data has been encrypted, because the encryption format of music data depends on the information provider. For instance, when information providers A, B, and C each provide music data, music data provided by the information provider A is encrypted in a format A, music data provided by the information provider B is encrypted in a format B, and music data provided by the information provider is encrypted in a format C. Note that the main object of the present invention in the first embodiment is to convert data on the secondary recording medium 114 according to an encryption format that is easily decoded by a playback apparatus and to protect the copyright when information that is provided by information providers are encrypted in a variety of formats. As a result, a detailed explanation of the algorithm of encryption will not be given herein.

In the attribute information 401, the price 406 and the information provider 407 are encrypted as necessary since the tampering of the price 406 and the information provider 407 can lead to a pecuniary or proprietary loss to the information provider.

When the data extraction unit 103 receives an instruction from the encryption method designation unit 109 to extract digital data, the data extraction unit 103 extracts the attribute information 401 from the primary recording medium 102 and informs the accounting unit 118 of the attribute information 401. Meanwhile, the data extraction unit 103 informs the judging unit 104 of information in the encryption format 408. Note that when the price 406 is encrypted in the attribute information 401, the data extraction unit 103 informs the accounting unit 118 of the price 406 after the decoding by the decryption unit group 105. Then, the data extraction unit 103 extracts the music data unit 402 from the primary recording medium 102, and outputs the extracted music data unit 402 to the judging unit 104. As has been described, the data extracted by the data extraction unit 103 has been encrypted using an encryption method that is specific to the information provider.

The judging unit 104 is informed of the encryption format 408 by the data extraction unit 103. Then, the judging unit 104 judges to which decryption unit of the decryption unit group 105 the music data is to be output according to the information of the encryption format 408.

The decryption unit group 105 includes "n" decryption units, where "n" is an integer greater than one. A first decryption unit 106 decodes digital data that has been encrypted in the format A, a second decryption unit 107 decodes digital data that has been encrypted in the format B, and an "n"th decryption unit 108 decodes digital data that has been encrypted in the format N. Each of the first, second, and nth decryption units 106, 107, and 108 is composed of the decode module of a different information provider.

For instance, when the information of the encryption format 408 indicates the format B, the judging unit 104 outputs the digital data in the music data unit 402 of the music data to the second decryption unit 107. The second decryption unit 107 decodes the inputted digital data and outputs the decoded digital data to the encryption method designation unit 109.

When a decryption key is necessary to decrypt encrypted data by one of the first, second, and nth decryption units 106, 107, and 108, the data transmit/receive unit 100 obtains a decryption key according to the encryption method of the data so as to decrypt the data. The first, second, and nth decryption units 106, 107, and 108 once decrypt the data that has been encrypted using a different encryption method according to the information provider.

When the encryption system designation unit 109 receives the designation of the type of the encryption method from the designation reception unit 117, the encryption method designation unit 109 instructs the inherent information obtaining unit 116 to obtain inherent information according to the designation of the encryption method. When the encryption method designation unit 109 is notified of the inherent information by the inherent information obtaining unit 116, the encryption method designation unit 109 instructs the data extraction unit 103 to extract music data. When the encryption method designation unit 109 is notified that the inherent information according to the designation of the encryption method cannot be obtained by the inherent information obtaining unit 116, the encryption method designation unit 109 shows that the designated encryption method cannot be used to re-encrypt data on the display unit (not illustrated). On the other hand, when the encryption method designation unit 109 does not receive the designation of the type of the encryption method from the designation reception unit 117, the encryption method designation unit 109 instructs the inherent information obtaining unit 116 to obtain inherent information according to the attribute of the secondary recording medium 114. When the encryption method designation unit 109 receives the notification concerning the obtainment of the inherent information of the secondary recording medium 114 from the inherent information obtaining unit 116, the encryption method designation unit 109 instructs the data extraction unit 103 to extract music data. When the encryption method designation unit 109 is notified that the inherent information of the secondary medium 114 cannot be obtained, the encryption method designation unit 109 generates random numbers.

When having received the designation of the kind of encryption method from the designation reception unit 117, the encryption method designation unit 109 selects one encryption unit according to the designation. When the encryption method generation unit 109 receives the input of decrypted digital data from one of the first, second, nth decryption units 106, 107, and 108, the encryption method designation unit 109 notifies the selected encryption unit of the decrypted digital data along with the inherent information that the encryption method generation unit 109 has been informed of by the inherent information obtaining unit 116.

When the encryption method designation unit 109 does not receive the designation of the type of the encryption method from the designation reception unit 117, the encryption method designation unit 109 selects one encryption unit according to the type of the inherent information that the encryption method designation unit 109 has been informed of by the inherent information obtaining unit 116. When the encryption method designation unit 109 receives the input of the decrypted digital data from one of the first, second, nth decryption units 106, 107, and 108, the encryption method designation unit 109 notifies the selected encryption unit of the digital data and the inherent information. On the other hand, when the encryption method designation unit 109 receives the notification that the inherent information cannot be obtained from the inherent information obtaining unit 116, the encryption method designation unit 109 notifies one of the encryption units of the digital data along with the generated random numbers.

The encryption unit group 110 includes "n" encryption units, which are a first, second, ..., "n"th encryption units 111, 112, ..., 113. Each of the encryption units 111, 112, ..., 113 re-encrypts the digital data of which each of the encryption units have been informed of by the encryption system designation unit 109 with a different encryption key, respectively. More specifically, the first encryption unit 111 re-encrypts data with an encryption key that is created according to the identification information which is inherent in the secondary recording medium 114. The second encryption unit 112 re-encrypts data with an encryption key that is created according to the identification information that is inherent in a playback apparatus (not illustrated) for playing back the secondary recording medium 114. The nth encryption unit 113 re-encrypts data with an encryption key that is created according to random numbers. Each of the data sizes of the encryption keys is set to be smaller than the data size of the encryption key of encrypted digital data that is recorded on the primary recording medium 102.

When the data size of the encryption key of re-encrypted digital data that is to be recorded on the secondary recording medium recording medium 114 is relatively small, the digital data is decrypted relatively easily. As a result, the structure which is necessary to decrypt the digital data of a playback apparatus for playing back the digital data is simple, thereby leading to a reduced cost for the playback apparatus.

For instance, when the encryption method designation unit 109 does not receive an instruction from the designation reception unit 117 and when the encryption method designation unit 109 is informed of the identification information of the secondary recording medium 114 from the inherent information obtaining unit 116, the encryption method designation unit 109 informs the first encryption unit 111 of the identification information of the secondary recording medium 114. The first encryption unit 111 creates an encryption key according to the informed identification information, rewrites the encryption format 408 of the attribute information 401 of the music data that the first encryption unit 111 has been informed of by the encryption system designation unit 109, and re-encrypts the music data unit 402 by using the created encryption key. The first encryption unit 111 informs the recording unit 115 of the re-encrypted digital data.

When the encryption method designation unit 109 receives the instruction to re-encrypt data using the inherent information of a playback apparatus (not illustrated) for playing back the secondary recording medium 114 from the designation reception unit 117, the encryption method designation unit 109 instructs the inherent information obtaining unit 116 to obtain the identification information which is inherent in the playback apparatus. When the encryption method designation unit 109 is informed of the identification information which is inherent in the playback apparatus from the inherent information obtaining unit 116, the encryption method designation unit 109 informs the second encryption unit 112 of the informed identification information and the decrypted digital data that the encryption method designation unit 109 has been informed of from the decryption unit group 105.

The second encryption unit 112 creates an encryption key according to the identification information that has been transferred from the encryption method designation unit 109, re-encrypts the digital data with the created encryption key, and informs the recording unit 115 of the re-encrypted digital data. As in the case where the encryption method designation unit 109 does not receive the instruction from the designation reception unit 117, the content of the encryption format 408 in the attribute information 401 is rewritten.

The secondary recording medium 114 is composed of a DVD-RAM disc (shown in FIG. 2), an MD, and a small-scale semiconductor memory that is either removable or non-removable according to the model of a playback apparatus (not illustrated) and the like. Music data that has been re-encrypted by the encryption unit group 110 is recorded on the secondary recording medium 114 by the recording unit 115. For instance, when digital data has been recorded on the DVD-RAM disc 203, the DVD-RAM disc 203 is inserted into the DVD-Audio player 204 so as to play music, as shown in FIG. 2.

The recording unit 115 is realized by, for instance, the DVD-RAM drive 202 shown in FIG. 2. The recording unit 115 records digital data that has been transferred from the encryption unit group 110 on the secondary recording medium 114. When the recording unit 115 completes recording, the recording unit 115 informs the accounting unit 118 of the completion.

When the inherent information obtaining unit 116 is instructed to obtain the identification information which is inherent in the secondary recording medium 114 by the encryption system designation unit 109, the inherent information obtaining unit 116 reads the information written in the BCA (Burst Cutting Area), and informs the encryption method designation unit 109 of the read information when the secondary recording medium 114 is a DVD-RAM, for instance. Note that each secondary recording medium 114 has a different piece of inherent identification information that has been recorded at the time of manufacturing, and as a result, the identification information cannot be read or rewritten by an ordinary user operation.

An encryption key is created according to the identification information, and digital data that is re-encrypted with the encryption key is recorded on a DVD-RAM disc. As a result, even if a user with a malicious intent makes a copy of the content of the DVD-RAM disc on another recording medium by using a tool for a bit copy and tries to play back the copied data on other recording media, the copied data cannot be normally decrypted since the information corresponding to the decryption key of the other recording medium is different from that of the DVD-RAM disc. In this way, the copyright of the music data is fully protected.

Meanwhile, when the inherent information obtaining unit 116 is instructed by the encryption method designation unit 109 to obtain the identification information which is inherent in the playback apparatus (not illustrated) in which the secondary recording medium 114 is placed therein the inherent information obtaining unit 116 reads the identification information of the playback apparatus and informs the encryption method designation unit 109 of the read identification information. Each playback apparatus also has a different piece of inherent identification information that has been assigned at the time of manufacturing, and as a result, the identification information cannot be read or rewritten by an ordinary user operation. Therefore, when data is re-encrypted according to identification information, the re-encrypted data can be played back only by a particular playback apparatus.

Note that when the inherent information obtaining unit 116 cannot obtain the inherent identification information that has been designated by the encryption method designation unit 109, i.e., when no identification information is assigned to the secondary recording medium 114 and the playback apparatus, the inherent information obtaining unit 116 informs the encryption method designation unit 109 that the designated inherent identification information cannot be obtained.

When the inherent information receiving unit 116 receives the instruction to obtain inherent identification information without the instruction of the type of the inherent identification information, the inherent information obtaining unit 116 judges (determines) whether the secondary recording medium 114 is either a recording medium that is removable from the playback apparatus such as a DVD-RAM disc or a recording medium that is built in the playback apparatus such as a small-scale semiconductive memory. When the secondary recording medium 114 is a removable recording medium, the inherent information obtaining unit 116 reads the inherent identification information of the secondary recording medium 114, and informs the encryption method designation unit 109 of the read inherent identification information. On the other hand, when the secondary recording medium 114 is a non-removable recording medium, the inherent information obtaining unit 116 reads the inherent identification information of the playback apparatus, and informs the encryption method designation unit 109 of the read inherent identification information. When identification information cannot be obtained, the inherent information obtaining unit 116 informs the encryption method designation unit 109 that identification information cannot be obtained.

The designation reception unit 117 is realized by the keyboard and the mouse of the PC. The designation reception unit 117 receives the instruction of the type of the encryption method from the user, and informs the encryption method designation unit 109 of the type of the encryption method.

While the homepage information in FIG. 3 shows only one type of price, the homepage information in FIG. 5 shows two types of price, i.e., a price (1) 501 and a price (2) 502.

While the price (1) 501 shows the price when digital data is re-encrypted at the time of recording according to the identification information which is inherent in the secondary recording medium 114, the price (2) 502 shows the price when digital data is re-encrypted at the time of recording according to the identification information which is inherent in the playback apparatus for playing back the secondary recording medium 114. Note that each of the prices (1) 501 and (2) 502 is freely set by the information provider.

The user specifies the encryption of the digital data in a desired encryption format with reference to the music and price information shown in FIG. 5 according to the usage pattern of the secondary recording medium 114 by using the designation reception unit 117. For instance, when digital data is to be played back in a specific playback apparatus, i.e., when the secondary recording medium 114 is not played back in other playback apparatuses, the user specifies that the digital data be re-encrypted according to the identification information which is inherent in the specific playback apparatus. As shown by the price (2) in FIG. 5, prices are generally cheap when data is re-encrypted according to the identification information of the playback apparatus. This is because the degree of freedom is low as compared with the encryption according to the identification information which is inherent in the secondary recording medium 114 since re-encrypted data is not played back in other playback apparatuses. When digital data is to be played back with any playback apparatus, the user specifies that the digital data be re-encrypted according to the identification information which is inherent in the secondary recording medium 114.

Note that although the designation reception unit 117 is integral with the reception unit 101, the designation reception unit 117 and the reception unit 101 are described as separate elements for a convenient explanation.

The accounting unit 118 receives the notification of the attribute information 401 of music data from the data extraction unit 103, and stores the received attribute information 401. When the accounting unit 118 is notified that re-encrypted digital data is recorded on the secondary recording medium 114 by the recording unit 115, the accounting unit 118 refers to the price 406 in the attribute information 401 so as to determine the charged amount, and writes the determined amount of charge along with the attribute information 401 in a secure area on the primary recording medium 102 as the accounting information.

Note that when the price 406 includes the prices (1) 501 and (2) 502 as shown in FIG. 5, the charged amount is determined according to one of the first to nth encryption units 111 to 113 that has been transferred to the accounting unit 118 as the used encryption unit from the encryption method designation unit 109.

Figure 6:
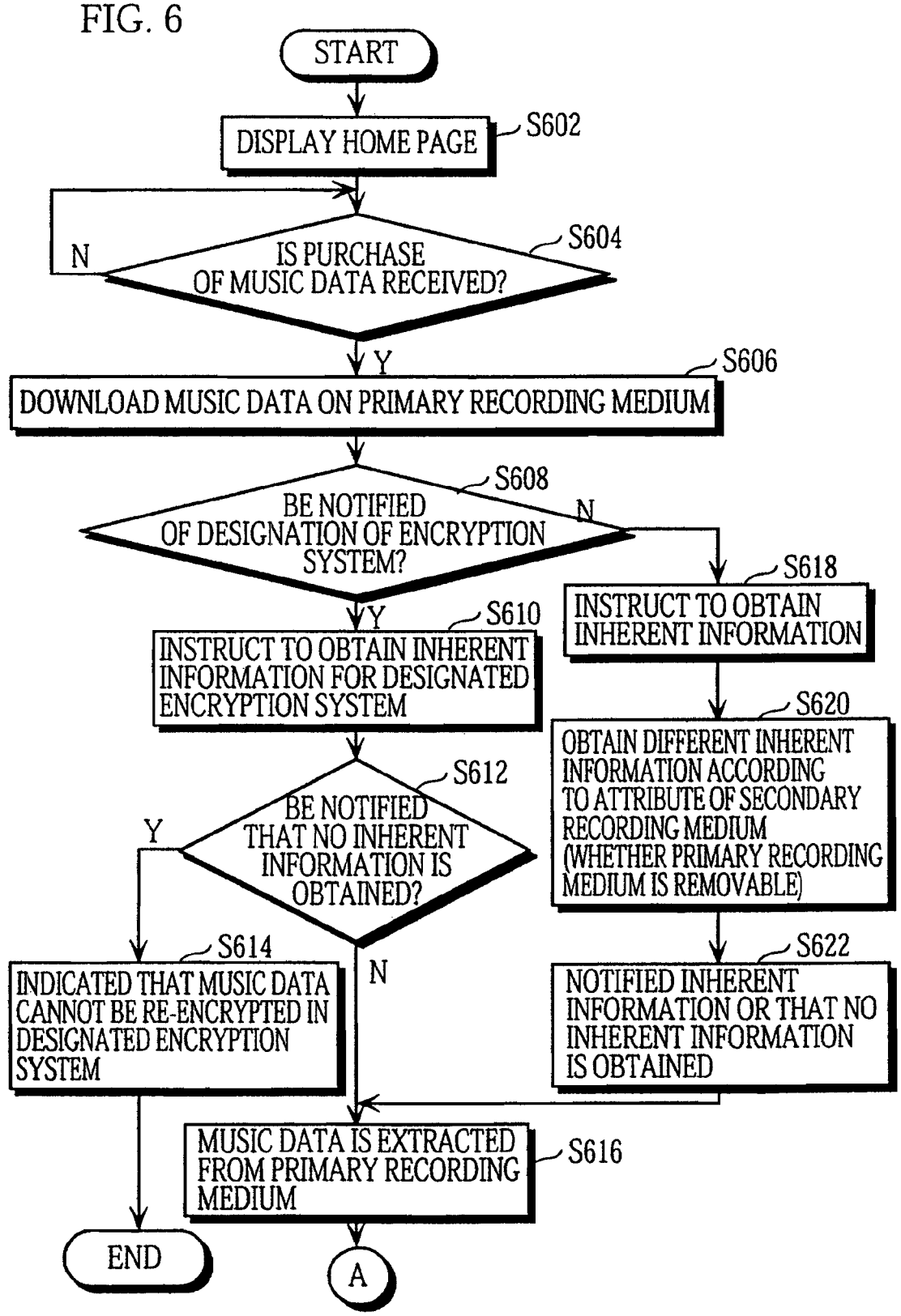
FIG. 6 is a first flowchart illustrating the operations in the first embodiment of the present invention.
Figure 7:
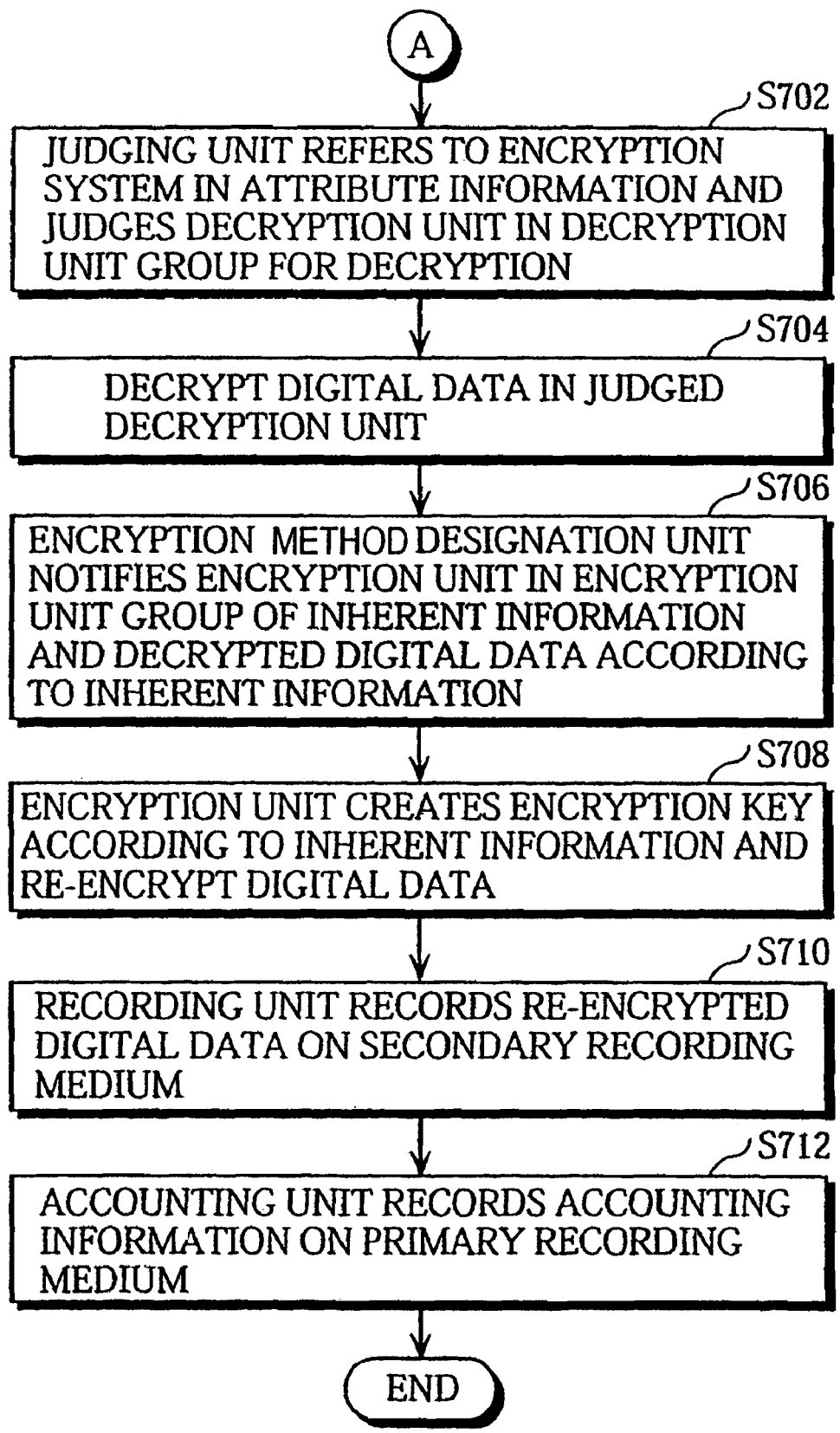
FIG. 7 is a second flowchart illustrating the operations in the first embodiment of the present invention.

Here, an explanation of the operations in the first embodiment will be given with reference to the flowcharts in FIGS. 6 and 7.

The reception unit 101 receives a home page requirement from the user, the data transmit/receive unit 100 accesses a homepage that is provided by an information provider of music data, and the data extraction unit 103 displays a homepage (refer to FIGS. 3 and 5) on the display unit (not illustrated) (step s602).

The data extraction unit 103 waits for an instruction to purchase music data that is designated by the user from the reception unit 101, and instructs the data transmit/receive unit 100 to receive the designated music data (step s604). When the data transmit/receive unit 100 receives the music data, the data transmit/receive unit 100 downloads the received music data on the primary recording medium 102 (s606).

Watching the homepage display, the user inputs the type of the encryption method according to the usage pattern of the secondary recording medium 114 by using the designation reception unit 117.

The encryption method designation unit 109 determines whether the designation reception unit 117 has informed the encryption method designation unit 109 of the designation of the type of the encryption method (step s608). When the encryption method designation unit 109 is informed of the designation of the type of the encryption method, the encryption method designation unit 109 instructs the inherent information obtaining unit 116 to obtain the inherent information that is to be used for the designated type of the encryption method of (step s610). The encryption method designation unit 109 determines whether the inherent information obtaining unit 116 has informed that the inherent information cannot be obtained (step s612). When the encryption method designation unit 109 is informed that the inherent information cannot be obtained, the encryption method designation unit 109 has the display unit (not illustrated) display that the music data cannot be re-encrypted according to the designated type of the encryption method (step s614) so as to complete the processing. On the other hand, when the encryption method designation unit 109 is informed of the inherent information for the designated type of the encryption method, the encryption method designation unit 109 instructs the data extraction unit 103 to extract the digital data. Then, the data extraction unit extracts the music data recorded on the primary recording medium 102 (step s616).

In step s608, when the encryption method designation unit 109 determines that the designation reception unit 117 has not informed the encryption method designation unit 109 of the designation of the type of the encryption method, the encryption method designation unit 109 instructs the inherent information obtaining unit 116 to obtain inherent information without designating the type of the inherent information (step s618).

The inherent information obtaining unit 116 determines the attribute of the secondary recording medium 114, i.e., determines whether the secondary recording medium 114 in the playback apparatus (not illustrated) is a removable recording medium. When the secondary recording medium 114 is a removable recording medium, the inherent information obtaining unit 116 obtains the identification information of the secondary recording medium 114. However, when the secondary recording medium 114 is a non-removable recording medium, the inherent information obtaining unit 116 obtains the identification information of the playback apparatus (step s620).

When the encryption method designation unit 109 is informed of the inherent (identification) information by the inherent information obtaining unit 116, or when the encryption method designation unit 109 is informed that inherent information has not been obtained (step s622), the encryption method designation unit 109 instructs the data extraction unit 103 to extract the digital data. The processing then advances to step s616.

Then, in step s702, the judging unit 104 refers to the encryption format 408 in the attribute information 401 of the music data that has been extracted by the data extraction unit 103 and determines which one of the first to nth decryption units 106 to 108 in the decryption unit group 105 decrypts the music data.

The decryption unit among the first to nth decryption units 106 to 108, as determined by the judging unit 104, decrypts the digital data that has been input via the judging unit 104, and outputs the decrypted digital data to the encryption method designation unit 109 (step s704).

The encryption method designation unit 109 selects an encryption unit from among the first to nth encryption units 111 to 113 in the encryption unit group 110 according to the inherent information that has been transferred from the inherent information obtaining unit 116 (including the information indicating that inherent information cannot be obtained), and the encryption method designation unit 109 informs the selected encryption unit of the inherent information (generated random numbers in the case where the information indicates that inherent information cannot be obtained) and the decrypted digital data (step s706).

The informed encryption unit among the first to nth encryption units 111 to 113 creates an encryption key according to the inherent (identification) information (according to the random numbers in the case of the information of the random numbers), and re-encrypts the digital data by using the created encryption key. At this time, the content of the encryption format 408 is rewritten in the attribute information 401 (step s708).

The recording unit 115 records the digital data that has been transferred from one of the first to nth encryption units 111 to 113 on the secondary recording medium 114 (step s710). When the recording unit 115 completes the recording, the recording unit 115 informs the accounting unit 118 of the recording completion.

When the accounting unit 115 receives the information from the recording unit 115, the accounting unit 118 determines the charged amount according to the price 406 and the like that has been transferred from the data extraction unit 103, and records the charged amount on the primary recording medium 102 (step s712) so as to complete the processing.

In the first embodiment, the decryption unit group 105 are composed of the decryption modules (the first to nth decryption units 106 to 108) each for different information providers. The decryption unit group may include different decryption units according to the quality of music data, for instance, for digital data in 24 bits of LPCM (Liner Pulse Code Modulation), MP3 (Moving Picture Experts Group 1 Audio Layer 3) and the like. More specifically, while high quality 24 bits of LPCM may be set as encrypted digital data that is difficult to decrypt, normal MP3 may be set as encrypted digital data that is not so difficult to decrypt, and the first decryption unit 106 may decrypt digital data in 24 bits of LPCM and the second decryption unit 107 may decrypt digital data in MP3.

In the first embodiment, the encryption unit group 110 includes the first to nth encryption units 111 to 113 each for different kinds of inherent information. The encryption units may correspond to the quality of music data. More specifically, digital data that has been decrypted by the first decryption unit 106 may be re-encrypted by the first encryption unit 111, digital data that has been decrypted by the second decryption unit 107 may be re-encrypted by the second encryption unit 112, and digital data that has been decrypted by the nth decryption unit 108 may be re-encrypted by the nth encryption unit 113. In this case, the data size of the encryption key used for encryption in the first encryption unit 111 is larger than the data size of the encryption key used in the second encryption unit 112, and the data size of the encryption key used in the second encryption unit 112 is larger than the data size of the encryption key used in the nth encryption unit 113. The accounting unit 118 determines the accounting amount of digital data according to the decryption unit that has decrypted the digital data and the encryption unit that has re-encrypted the digital data. As a result, the higher the quality of digital data, the more surely the copyright is protected. In this case, the information provider may set higher price for music data with higher quality.

The digital data recording apparatus according to the first embodiment has the structure shown in FIG. 1. It is possible to record a program on a computer-readable recording medium such as a floppy disk that has a computer realize the functions of the elements of the digital data recording apparatus, and to protect copyrights by applying the computer readable recording medium to a digital data recording apparatus that has no function of protecting copyrights.

In the first embodiment, digital data is downloaded from the host computer when the user requires the purchase of the digital data. It is possible to temporarily record music data or only the attribute information on the primary recording medium in the PC of the user regardless of the purchase, and to purchase digital data that has been recorded on the primary recording medium 102.

While the attribute information 401 and the music data unit 402 are separately described in the first embodiment, the attribute information 401 may be embedded in the digital data in the music data 402 by using Water Mark (electronic watermark) technology.

In the first embodiment, the data input and output between the decryption unit group 105 and the encryption unit group 110 via the encryption method designation unit 109 has not been referred to in particular. For security purposes is possible to prevent the leakage of decrypted data by transmitting data after authentication or by realizing the decryption unit group 105, the encryption method designation unit 109, and the encryption unit group 110 with one chip.

In addition, while accounting information is recorded in a secure area on the primary recording medium 102 in the first embodiment, accounting information may be recorded on another recording medium such as an IC card.

No explanation of the timing of accounting has been given in the first embodiment. It is possible to suppose that the modem is connected to the host computer when digital data is recorded on the secondary recording medium 114, to suppose that the modem is automatically connected to the host computer when the amount of charge reaches to a set amount, or to suppose that the modem is connected to the host computer when a set period of time has elapsed since the recording of accounting information.

In addition, while it has been described that only audio information is provided by the information provider in the first embodiment, video information, audio information, character information, the combination of video information, audio information, and character information, and the like may be provided.

Second Embodiment

Figure 8:
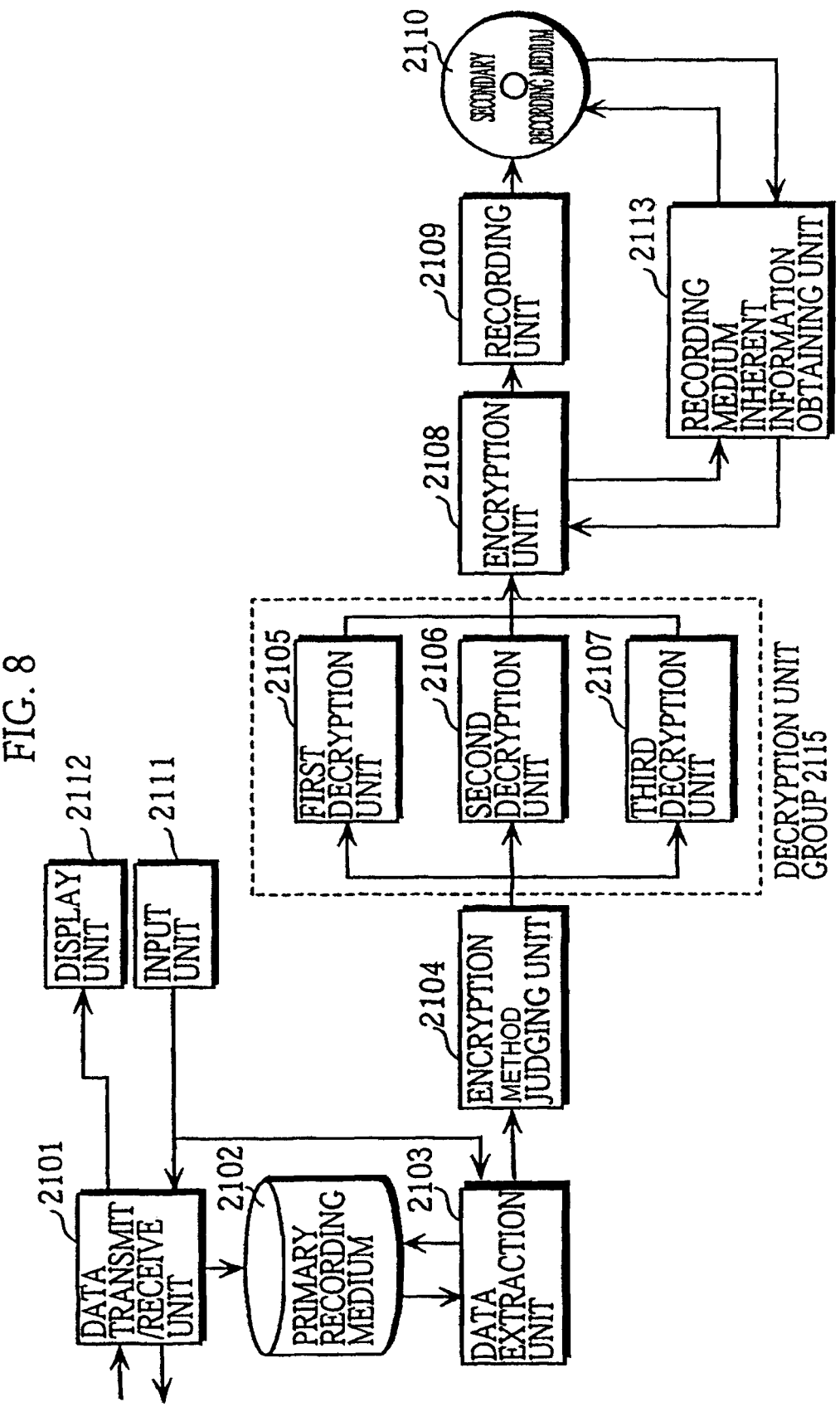
FIG. 8 shows the structure of a digital data recording apparatus according to a second embodiment of the present invention.

FIG. 8 shows the structure of a digital data recording apparatus according to a second embodiment of the present invention. The digital data recording apparatus of the second embodiment is generally realized by a personal computer. The digital data recording apparatus of the second embodiment includes a data transmit/receive unit 2101, a primary recording medium 2102, a data extraction unit 2103, an encryption method judging unit 2104, a first decryption unit 2105, a second decryption unit 2106, a third decryption unit 2107, an encryption unit 2108, a recording unit 2109, a secondary recording medium 2110, an input unit 2111, a display unit 2112, and a recording medium inherent information obtaining unit 2113. While a decryption unit group 2115 is composed of the first, second and third decryption units 2105, 2106 and 2107, the number of decryption units in the decryption unit group 2115 is not limited to three. The decryption unit group 2115 is composed of a plurality of decryption units.

Note that data to be recorded in the second embodiment are music data that are distributed through the Internet. The music data are supposed to be encrypted using different encryption methods according to the respective providers.

An information provider provides music data and information which includes music titles, prices, copy control information, and the like (herein after referred to as "attribute information" in this specification) that are necessary at the time of purchase and which may arouse the interest of users together or separately. In the second embodiment, the attribute information and music data are supposed to be separately provided.

The data transmit/receive unit 2101 is a communication unit that is realized by a modem, and is connected to the host computer (not illustrated) of the information provider through a telephone line. The attribute information that the data transmit/receive unit 2101 obtains is recorded on the primary recording medium 2102, and the entire attribute information or a part thereof is displayed on the display unit 2112. FIG. 9 is an example of the information that is displayed on the display unit 2112. Information such as titles 2201, title codes 2202, singers 2203, and data sources 2204 are displayed. Here, a title 2201 and a singer 2203 show the title and singer of one piece of music data, respectively. A title code 2202 is an identifier for distinguishing one piece of music data from another piece of music data. A piece of ISRC (International Standard Recording Code) information is added to a title code 2202, for instance. According to the information, the user selects a piece of desired music and transfers the purchase requirement via the input unit 2111. A data source 2204 is a URL (Uniform Resource Locator) for specifying the location of a piece of music data. When ISRC information is added to a title code 2202, the data source can be identified by the title code 2202.

The input unit 2111 is realized by a mouse, a keyboard, and the like. The input unit 2111 receives an instruction to purchase music, i.e., a recording instruction, and informs the data transmit/receive unit 2101 of the instruction. The user clicks or designates the title and the like of the selected music with the mouse according to the information that is displayed on the display unit 2112 so as to provide an instruction for the recording of the music data.

When the data transmit/receive unit 2102 receives the instruction to record the music data, the data transmit/receive unit 2101 downloads the desired music data from the host computer of the respective provider through the telephone line. At this time, the location of the music data is specified according to the URL in the attribute information. The music data downloaded is once recorded on the primary recording medium 2102.

The primary recording medium 2102 is generally a hard disk in the PC, and records the desired music data without decrypting. As a result, the digital data recording apparatus is not necessarily connected to the host computer of the provider during the following operations.

The data extraction unit 2103 extracts the music data to be recorded from the primary recording medium 2102. At this time, the user selects the music data to be recorded on the secondary recording medium 2110 with the input unit 2111 according to the information that is displayed on the display unit 2112, which is almost equivalent to the information shown in FIG. 9. The data that is extracted by the data extraction unit 2103 has been encrypted using an encryption method according to the information provider, and as a result, the encryption method judging unit 2104 determines an appropriate system to decrypt the data. For example, information for identifying the encryption method of digital data is added to the header of the digital data, or the attribute information indicates the encryption method, and the encryption method judging unit 2104 determines the encryption data according to such information.

The first, second, and third decryption units, 2105, 2106, and 2107 show that digital data are decrypted in different methods according to the information providers. As described above, the number of decryption units is not limited to three. The encryption method judging unit 2104 selects an appropriate decryption unit, and the selected decryption unit decrypts the encrypted data. More specifically, the encryption method judging unit 2104 obtains or creates a decryption key corresponding to the obtained encryption system of the data, and the selected decryption unit decrypts the data with the obtained or created decryption key. As a result, data that have been encrypted using different encryption method are once decrypted.

The encryption unit 2108 re-encrypts the decrypted data. In the second embodiment, information which is inherent in the recording medium is supposed to be used as the encryption key information at the time of encryption. Note that a method of encryption according to information which is inherent in a recording medium is described in Japanese Laid-Open Patent Application No. 05-257816, so a detailed explanation will not be given here.

The recording medium inherent information obtaining unit 2113 extracts the inherent information from the secondary recording medium 2110 according to an instruction from the encryption unit 2108, and transfers the extracted inherent information to the encryption unit 2108.

The encryption unit 2108 re-encrypts data by using the inherent information that has been obtained by the recording medium inherent information obtaining unit 2113 as the encryption key.

Here, an explanation of the information which is inherent to the secondary recording medium 2110 will be given.

Each secondary recording medium 2110 has a different inherent identification information. When a secondary recording medium 2110 is a DVD-RAM, the inherent identification information is the information written in the BCA (Burst Cutting Area). Each disc has a different information in the BCA, and the information is recorded at the time of manufacturing and is not rewritable. As a result, even if a user with a malicious intent makes a copy of the content of the disc on another recording medium by using a tool for a bit copy, the copied data cannot be decrypted since the information corresponding to the decryption key of the other recording medium is different from that of the disc. In this way, the copyright of the data is surely protected.

The recording unit 2109 records the re-encrypted data on the secondary recording medium 2110.

Figure 10:
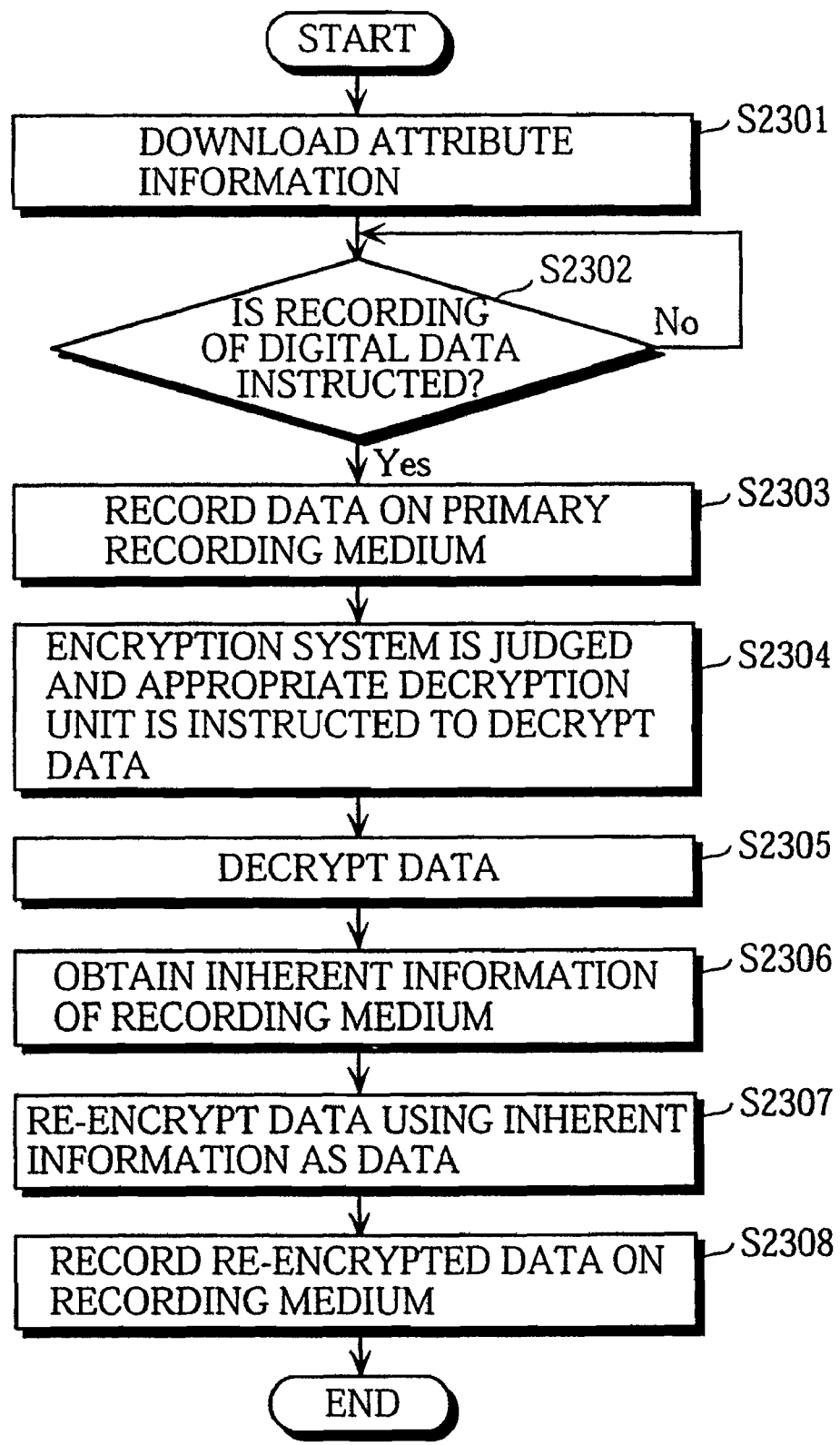
FIG. 10 is a flowchart showing the operations in the second embodiment.

An explanation of the operations by the digital data recording apparatus, the structure of which having been described, will be given with reference to the flowchart in FIG. 10.

The data transmit/receive unit 2101 downloads the attribute information (step s2301), and waits for an instruction from the user to record digital data (step s2302). The data transmit/receive unit 2101 downloads the designated digital data and records the digital data on the primary recording medium 2102 (step s2303). The encryption method of the downloaded data is determined, and an appropriate decryption unit among the first, second, and third decryption units 2105, 2106, and 2107 is instructed (designated) to decrypt the data (step s2304). The designated decryption unit among the first, second, and third decryption units 2105, 2106, and 2107 decrypts the data (step s2305). When the decrypted data is input in to the encryption unit 2108 by the designated decryption unit, the encryption unit 2108 obtains the inherent information of the secondary recording medium 2110 from the recording medium inherent information obtaining unit 2113 (step s2306). An encryption key is created or obtained by using the obtained inherent information as part of the encryption key, and the encryption unit 2108 re-encrypts the data (step s2307). The recording unit 2109 records the re-encrypted data on the secondary recording medium 2110 (step s2308), and then, the processing is completed.

An explanation has been given of the digital data recording apparatus according to the second embodiment of the present invention.

An explanation of a digital data recording apparatus according to a third embodiment of the present invention will be given below.

Third Embodiment

Figure 11:
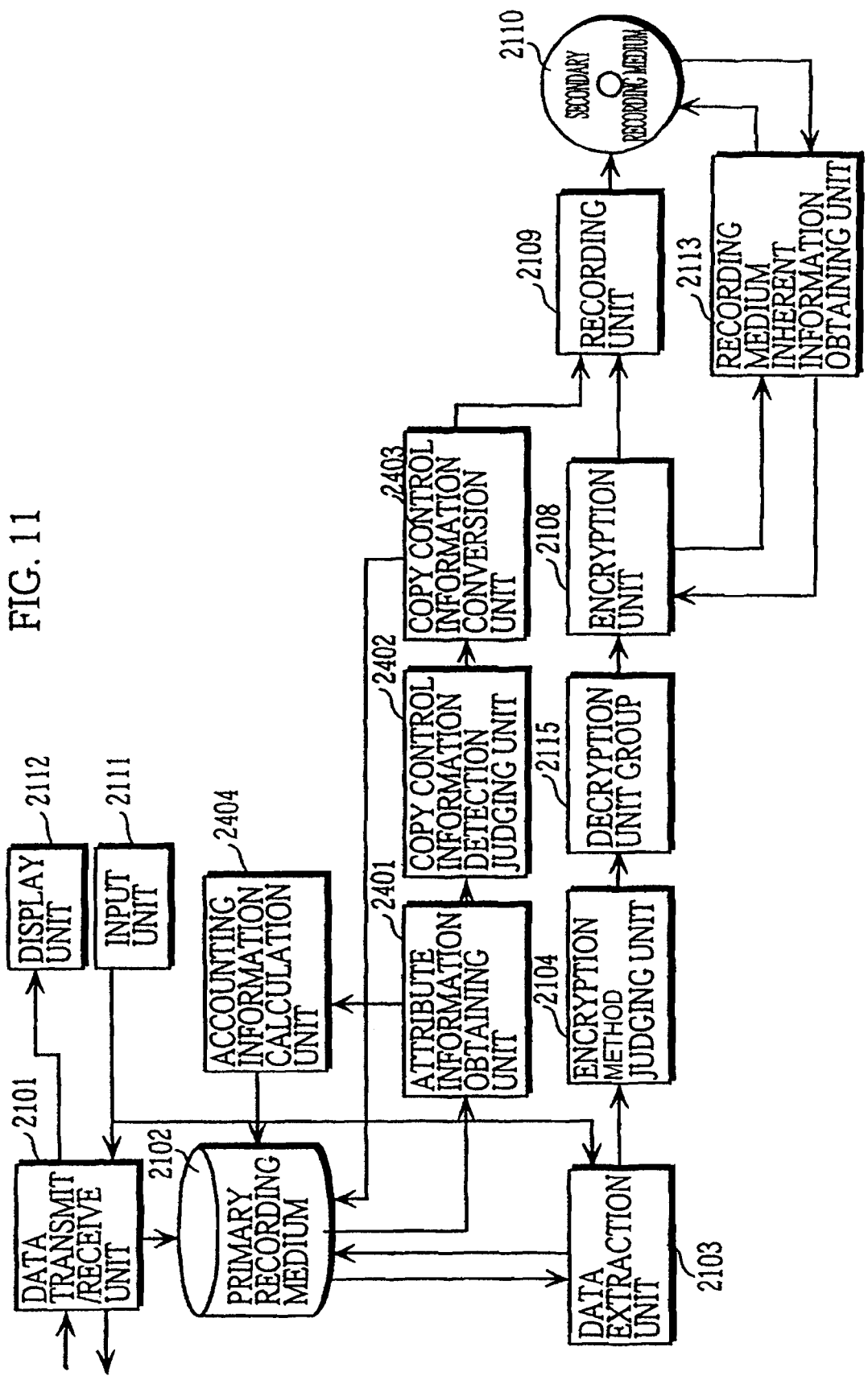
FIG. 11 shows the structure of a digital data recording apparatus according to a third embodiment of the present invention.

FIG. 11 shows the structure of the digital data recording apparatus according to the third embodiment of the present invention. The digital data recording apparatus of the third embodiment is generally realized by a PC. The digital data recording apparatus of the third embodiment includes a data transmit/receive unit 2101, a primary recording medium 2102, a data extraction unit 2103, an encryption method judging unit 2104, a decryption unit group 2115, an attribute information obtaining unit 2401, a copy control information detection judging unit 2402, a copy control information conversion unit 2403, an accounting information calculation unit 2404, an encryption unit 2108, a secondary recording medium 2110, an input unit 2111, a display unit 2112, and a recording medium inherent information obtaining unit 2113.

Note that the elements of the digital data recording apparatus that are the same in the second and third embodiments have the same reference numbers and explanations of such elements are not given below.

FIG. 12 shows the attribute information of data in the third embodiment. The attribute information in FIG. 12 includes copy control information 2501 and accounting information 2502 in addition to the attribute information shown in FIG. 9. The copy control information 2501 shows the number of times that the data can be recopied or copied. For instance, in terms of the number of times that the data can be recopied, a value corresponding to "no limit", "copying only (no recopying)", "no copying" and the like is shown. On the other hand, the number of times that the data can be copied is an integer larger than "0". More specifically, "no recopying" means that digital data that has been recorded on a secondary recording medium 2110 cannot be recopied. "No limit" means that the data can be copied any number of times. The copying times, such as, "two copies" means that data can be copied on two secondary recording media 2110.

The attribute information obtaining unit 2401 obtains attribute information corresponding to the data to be reproduced from the primary recording medium 2102. In the third embodiment, the copy control information and the accounting information 2502 are extracted from the attribute information by the copy control information detection judging unit 2402 and the accounting information calculation unit 2404, respectively, as will be described below. Note that since the attribute information includes copyright protection information and the accounting information 2502, it is desirable to record the attribute information in a secure area on the primary recording medium 2102 so that the attribute information could not be accessed by an ordinary user operation.

The copy control information detection judging unit 2402 extracts the copy control information from the attribute information so as to obtain the information that indicates whether copying or recopying is allowed and the number of times that data can be copied or recopied.

When copying or recopying is allowed, the copy control information conversion unit 2403 rewrites the copy control information as necessary. For instance, when recopying is prohibited, the copy control information conversion unit 2403 changes the value of the copy control information 2501 so that recopying would be prohibited. When the number of times that the data is copied is limited, the copy control information conversion unit 2403 changes the value of the copy control information 2501 by "1" so that the value recorded on the secondary recording medium 2110 would be a number that is less than the allowed copying number recorded on the primary recording medium 2102.

When the allowed copying number is set, what is important is the number of times that the data on the primary recording medium 2102 is recorded on the secondary recording medium 2110. The rewriting of the copy control information is to rewrite the copy control information value that is recorded on the primary recording medium 2102. As a result, the allowed copying number that has been recorded on the primary recording medium 2102 is decreased by "1", and the allowed copying number that is to be recorded on the secondary recording medium is "0".

The accounting information calculation unit 2404 obtains the accounting information of the desired music data from the attribute information that has been obtained by the attribute information obtaining unit 2401, calculates the charged amount according to the accounting information, and records the calculated charged amount in a secure area on the primary recording medium 2102.

Figure 13:
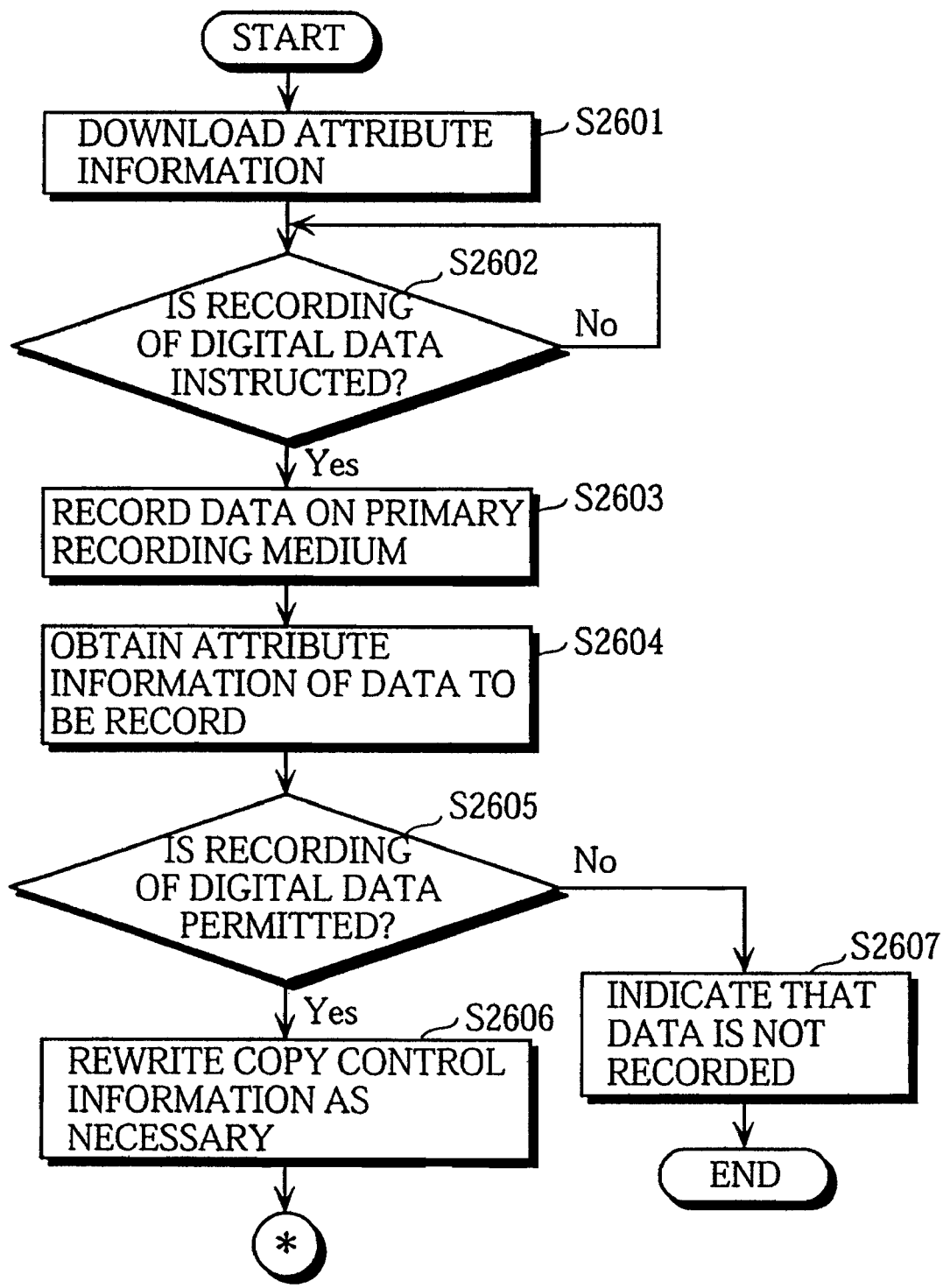
FIG. 13 is a flowchart showing operations in the third embodiment.
Figure 14:
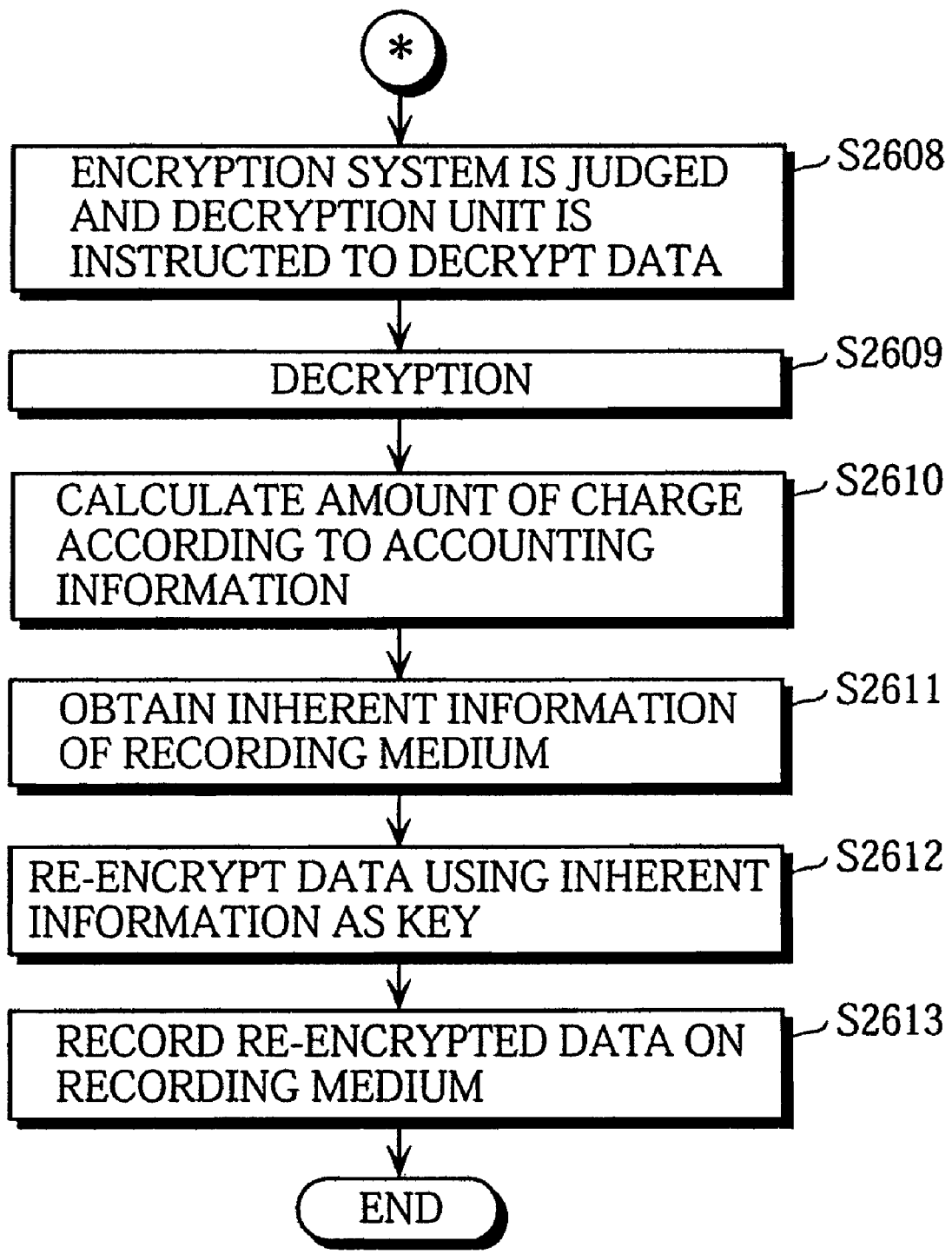
FIG. 14 is a flowchart showing operations in the third embodiment.

An explanation of the operations of the digital data recording apparatus, the structure of which having been described, will be given with reference to the flowcharts in FIGS. 13 and 14.

First, the data transmit/receive unit 2101 downloads the attribute information (step s2601), waits for a recording instruction of the digital data from the user (step s2602), downloads the designated digital data, and records the downloaded digital data on the primary recording medium 2102 (step s2603). Then, the data transmit/receive unit 2101 obtains the attribute information of the data to be recorded from the attribute information obtaining unit 2401 (step s2604). The copy control information detection judging unit 2402 determines the copy control information 2501 in the attribute information and determines whether copying is allowed (step s2605). When copying is allowed, the allowed number of times of recopying or copying is obtained, and the obtained number of times is rewritten by the copy control information conversion unit 2403 as necessary (step s2606). On the other hand, when copying is not allowed, the processing is discontinued (step s2607). Then, the encryption method is determined, and an appropriate decryption unit in the decryption unit group 2115 is instructed (designated) to decrypt the digital data (step s2608). The designated decryption unit among the first, second, and third decryption units decrypts the digital data (step s2609). After the decryption, the charged amount is calculated according to the accounting information that has been obtained by the attribute information obtaining unit 2401 (step s2610).

When the encryption unit 2108 receives the decrypted data from the designated decryption unit, the encryption unit 2108 obtains the inherent information of the secondary recording medium 2110 from the recording medium inherent information obtaining unit 2113 (step s2611). An encryption key including the obtained inherent information as part thereof is created, and the encryption unit 2108 re-encrypts the data (step s2612). The recording unit 2109 records the re-encrypted data on the secondary recording medium 2110 (step s2613), and the processing is completed.

Up to this point, an explanation of the third embodiment of the present invention has been given.

Fourth Embodiment

Figure 15:
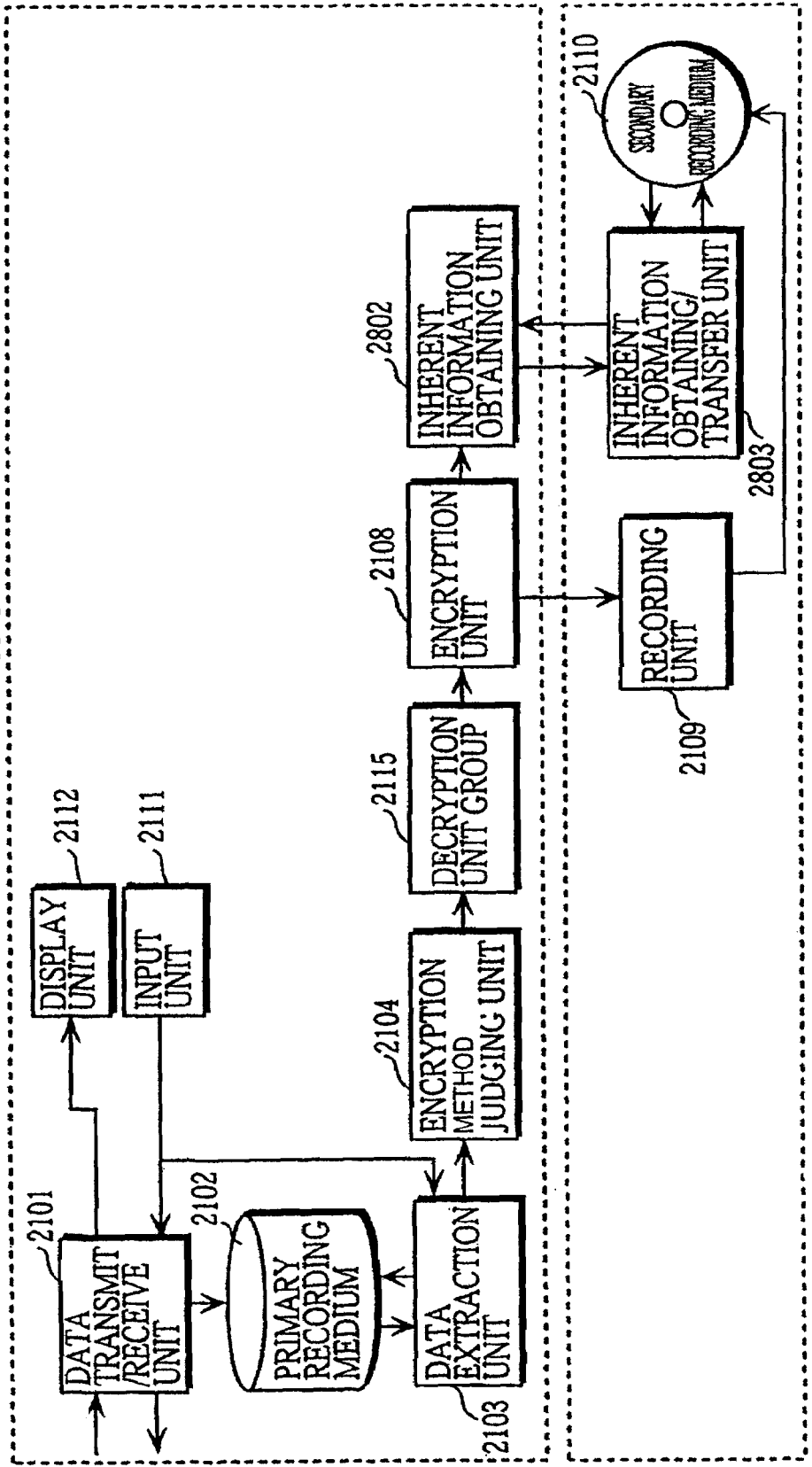
FIG. 15 shows the structure of the digital data recording apparatus according to a fourth embodiment of the present invention.

An explanation of a digital data recording apparatus according to the fourth embodiment of the present invention will be given. The digital data recording apparatus of the fourth embodiment is different from the digital data recording apparatus in the second embodiment with respect to encryption key information and in that the digital data recording apparatus of the fourth embodiment includes an inherent information obtaining/transfer unit 2803, a recording unit 2109, and a secondary recording medium 2110 in a second digital data recording apparatus 2801. FIG. 15 shows the structure of the digital data recording apparatus according to the fourth embodiment of the present invention. The digital data recording apparatus of the fourth embodiment is composed of a first digital data recording apparatus 2800 and the second digital data recording apparatus apparatuses 2800 and 2801.

The first digital data recording apparatus 2800 includes a data transmit/receive unit 2101, a primary recording medium 2102, a data extraction unit 2103, an encryption method judging unit 2104, a decryption unit group 2115, an encryption unit 2108, an input unit 2111, a display unit 2112, and an inherent information obtaining unit 2802.

The second digital data recording apparatus 2801 includes the inherent information obtaining/transfer unit 2803, the recording unit 2109, and the secondary recording medium 2110.

Note that the elements of the digital data recording apparatus of the fourth embodiment that are the same in the second embodiment have the same reference numbers and explanations of such elements are not given below.

When the data that has been decrypted in the decryption unit group 2115 is input into the encryption unit 2108, the inherent information obtaining unit 2802 requires the inherent information obtaining/transfer unit 2803 in the second digital data recording apparatus 2801 to transfer inherent information. The inherent information obtaining/transfer unit 2803 obtains either the identification information which is inherent in the secondary recording medium 2110 in the second digital data recording apparatus 2801 or the identification information which is inherent in the second digital data recording apparatus 2801, and the inherent information obtaining/transfer unit 2803 transfers the obtained identification information to the inherent information obtaining unit 2802.

The encryption unit 2108 creates an encryption key by using the identification information which is inherent in the secondary recording medium 2110 in the second digital data recording apparatus, the identification information which is inherent in the second digital data recording apparatus 2801, or the combination of these identification information, and the encryption unit 2108 re-encrypts the decrypted data. The encryption unit 2108 outputs the re-encrypted data to the second digital data recording apparatus 2801. The recording unit 2109 in the second digital data recording apparatus 2801 records the re-encrypted data on the secondary recording medium 2110.

Note that the inherent information that is obtained and transferred by the inherent information obtaining/transfer unit 2803 is the identification information which is inherent in the second digital data recording apparatus 2801 when the secondary recording medium 2110 is fixed in the second digital data recording apparatus 2801, and is the identification information which is inherent in the secondary recording medium 2110 or the combination of the identification information which is inherent in the second digital data recording apparatus 2801 and the identification information inherent in the secondary recording medium 2110 when the secondary recording medium 2110 is removable from the second digital data recording apparatus 2801. As a result, more flexible encryption methods can be available.

Up to this point, an explanation of the fourth embodiment of the present invention has been given.

Fifth Embodiment

Here, an explanation of a digital data recording apparatus according to a fifth embodiment of the present invention will be given. The digital data recording apparatus of the fifth embodiment is almost the same as those in the second, third, and fourth embodiments. The explanation of the digital data recording apparatus of the fifth embodiment will be given with reference to the block diagram in FIG. 15 used in the description of the fourth embodiment. The digital data recording apparatus of the fifth embodiment is different from the digital data recording apparatus of the fourth embodiment with regard to adopting an encryption method corresponding to the secondary recording medium 2110 at the time of recording. More specifically, since the minimum unit of data, or the unit of data amount at the time of writing encrypted data, is different for a DVD-RAM and a semiconductor memory, the inherent information obtaining unit 2802 obtains information of the particular medium from the inherent information obtaining/transfer unit 2803 so as to re-encrypt data in a optimal unit of data. As a result, a plurality of encryption units 2108 are included and inherent information and medium information are transferred to an appropriate encryption unit among the plurality of encryption units 2108. By doing so, not only a DVD-RAM but also a semiconductor memory, an IC card, and a hard disk can be used as the secondary recording medium 2110.

Up to this point, an explanation of the fifth embodiment has been given.

Note that the second through fifth embodiments of the present invention have been explained as examples of a system by which optimal effects can be expected under the present situation. The embodiments can be changed within the range of the basic principles of the present invention. Examples of changed embodiments will be given below.

In the second through fifth embodiments, digital data is downloaded from the host computer when the user requests to purchase the digital data. It is possible to record digital data on the primary recording medium 2102 in the user's PC regardless of the purchase and to request to purchase digital data that has been recorded on the primary recording medium 2102.

In the second through fifth embodiments, copy control information is indicated in the attribute information. It is possible to embed copy control information into digital data by using Water Mark technology.

While it has been explained that the accounting information is recorded in a secure area on the primary recording medium 2102, it is possible to provide another recording medium other than the primary recording medium 2102 such as an IC card to record the accounting information.

While the information that is provided by the information provider is audio information in the second through fifth embodiments, the information is not limited to audio information. The information can be video information, audio information, character information, or the combination of video, audio, and character information.

Sixth Embodiment

Figure 16:
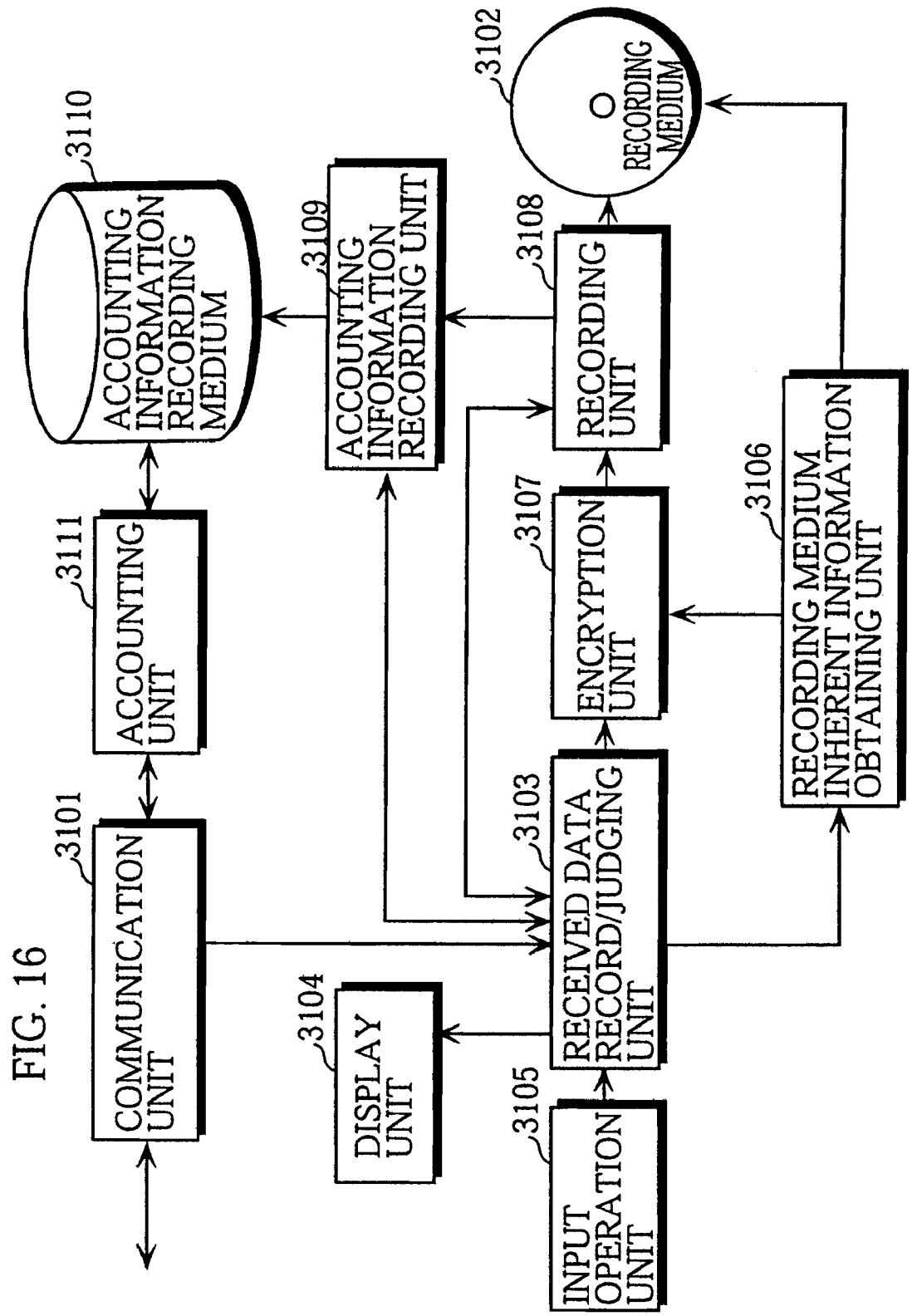
FIG. 16 shows the structure of a digital data recording apparatus according to a sixth embodiment of the present invention.

FIG. 16 shows the structure of a digital data recording apparatus according to a sixth embodiment of the present invention.

The digital data recording apparatus of the sixth embodiment includes a communication unit 3101, a recording medium 3102, a received data record/judging unit 3103, a display unit 3104, an input operation unit 3105, a recording medium inherent information obtaining unit 3106, an encryption unit 3107, a recording unit 3108, an accounting information recording unit 3109, an accounting information recording medium 3110, and an accounting unit 3111. The digital data recording apparatus of the sixth embodiment is realized by a PC.

The communication unit 3101 is realized by a modem, and is connected to the host computer (not illustrated) of a data provider and an accounting center (not illustrated) via a telephone line. When the communication unit 3101 receives digital data and the attribute information from the host computer, the communication unit 3101 informs the received data record/judging unit 3103 of the reception of the digital data and the attribute information.

When the communication unit 3101 receives an inquiry of the charge from the accounting center, the communication unit 3101 informs the accounting unit 3111 of the inquiry. When the communication unit 3101 is informed of accounting information by the accounting unit 3111, the communication unit 3101 informs the accounting center of accounting information via the telephone line.

Note that digital data provided by the data provider is supposed to be music data in the sixth embodiment. Music data to be provided is supposed to be encrypted digital data, and an information identifier is supposed to be added to a piece of digital data. The information identifier of a piece of music data is supposed to be the title code for distinguishing the music from another piece of music data.

Attribute information is also supposed to be added to a piece of digital data. Attribute information includes information indicating the charge and the provider of digital data.

FIG. 17 is an example of the attribute information. The attribute information 3201 includes titles 3202, performers (singers) 3203, title codes 3204, recording charges 3205, charges per reproduction 3206, maximum numbers of reproducing 3207, encryption conditions 3208, and copy permissions 3209.

The titles 3202 and the performers 3203 are displayed on the display unit 3104. The user indicates to copy (replicate) the digital data according to the titles 3202 and the performers 3203. A title code is unique to a piece of music for distinguishing the music from another piece of music. For instance, an ISRC is used as a title code 3204. Note that the ISRC is composed of a country code (two ASCII characters), an owner code (three ASCII characters), a recording year (two-digit numbers), and a serial number (five-digit numbers).

A recording charge 3205, a charge per reproduction 3206, a maximum number of reproducing 3207, and the like are included in accounting standard data, and are information for calculating the charges of a piece of music data.

A recording charge 3205 indicates a charge when the digital data that has been received by the communication unit 3101 is recorded on the recording medium 3102. A charge per reproduction 3206 indicates the charge for each time the digital data that has been recorded on the recording medium 3102 is reproduced. A maximum number of reproducing 3207 indicates the maximum number of times that the digital data that has been recorded on the recording medium 3102 can be reproduced. For instance, when a maximum number of reproducing 3207 is "100", the digital data can be reproduced up to 100 times. Note that it is possible to set a maximum number of reproducing 3207 so that no additional charge is required after the number of reproducing reaches a certain number of times.

An encryption condition 3208 is a flag showing whether the digital data that has been received by the communication unit 3101 is an encrypted data.

A copy permission 3209 is a flag that is recorded by the user, and the copy permission 3209 shows whether it is permitted to record music data that has been received by the recording medium 3102. For instance, "only once" indicates that the music data is permitted to be recorded only once, and "permitted" indicates that the music data is permitted to be recorded any number of times.

Note that the main object of the present invention is to protect the copyright of received music data when the music data is recorded (replicated) on the recording medium 3102, and therefore, an explanation of a case where it is only permitted to listen to music data will be briefly given. In this case, the copy permission 3209 is "not permitted". While neither the decryption unit nor the input unit is included in the structure shown in FIG. 16, digital data that has been received by the communication unit 3101 is decrypted by a decryption unit so as to input music from an input unit. At this time, the accounting standard data includes a listening charge.

The recording medium 3102 is composed of a rewritable storage element such as a DVD-RAM, and is removable from the digital data recording apparatus of the sixth embodiment.

Inherent information of the recording medium 3102 is recorded in advance in a non-rewritable secure area on the recording medium 3102.

The digital data that has been re-encrypted by the encryption unit 3107 is recorded by the recording unit 3108 on the recording medium 3102.

In addition, the management information and attribute information of the recorded digital data are recorded on the recording medium 3102 by the recording unit 3108.

When the received data record/judging unit 3103 is informed of the digital data and the attribute information 3201 from the communication unit 3101, the received data record/judging unit 3103 stores the attribute information 3201, has the display unit 3104 display the title 3202, the player 3203, the recording charge 3205, the charge per reproduction 3206 and the like, and informs the encryption unit 3107 of the digital data.

When the received data record/judging unit 3103 receives an instruction to copy (replicate) music, the received data record/judging unit 3103 judges whether the digital data corresponding to the title code 3204 of the designated music can be copied by referring to the copy permission 3209 of the attribute information. When the digital data can be copied by the recording unit 3108, the received data record/judging unit 3103 instructs the recording medium inherent information obtaining unit 3106 to obtain the inherent information of the recording medium 3102, and informs the encryption unit 3107 of the title code 3204 and the encryption condition 3208.

When the recording unit 3108 is not permitted to copy the digital data, the received data record/judging unit 3103 has the display unit 3104 display that copying of the digital data is not permitted.

When the received data record/judging unit 3103 is notified that the digital data has been copied by the recording unit 3108, the received data record/judging unit 3103 rewrites the copy permission 3209 in the stored attribute information 3201. More specifically, when the copy permission 3209 is "only once", the "only once" is changed to "not permitted". When the number of times of copying is greater than one, the number of times that copying is permitted is decreased by one. Note that the storage area for storing the attribute information 3201 is in the EEPROM (Electrically Erasable and Programmable ROM), and as a result, the storage content is not erased when the power of the digital data recording medium is turned off.

For instance, when the received data record/judging unit 3103 is informed of the completion of copying by the recording unit 3108 after informing the encryption unit 3107 of the title code 3204 "song01", the received data record/judging unit 3103 changes the copy permission 3209 corresponding to the title code "song01" from "only once" to "not permitted". As a result, any violation of the copyright of the data provider can be prevented.

The display unit 3104 is composed of a liquid crystal display or a CRT (Cathode-Ray-Tube). The display unit 3104 displays the title of the music data (digital data), or the display unit 3104, indicates that the digital data cannot be copied under the control of the received data record/judging unit 3103.

The input operation unit 3105 is composed of a mouse and the like. The input operation unit 3105 receives the user's instruction to copy digital data and informs the received data record/judging unit 3103 of the user's instruction. When downloading a piece of music upon referring to titles and players that are displayed by the display unit 3104, the user clicks the title and the like with the mouse and instructs the copying of the music.

When the recording medium inherent information unit receives an instruction to obtain the inherent information from the received data record/judging unit 3103, the recording medium inherent information obtaining unit 3106 reads the inherent information that has been recorded in a secure area on the recording medium 3102, and the recording medium inherent information obtaining unit 3106 informs the encryption unit 3107 of the read inherent information.

The encryption unit 3107 creates an encryption key according to the inherent information that has been received from the recording medium inherent information obtaining unit 3106. The encryption unit 3107 re-encrypts the digital data that has been received from the received data record/judging unit 3103 by using the created encryption key, and informs the recording unit 3108 of the re-encrypted digital data.

Note that when the encryption unit 3107 is informed that the digital data that has been received from the received data record/judging unit 3103 has been encrypted, the encryption unit 3107 causes the digital data to be decrypted, or the encryption unit 3107 uses the digital data without a decryption.

More specifically, when the encryption unit 3107 is informed of digital data "data A", which is to be recorded on the recording medium 3102, by the received data record/judging unit 3103, the encryption unit 3107 creates an encryption key "KM" according to the inherent information of the recording medium 3102, and the encryption unit 3107 re-encrypts the digital data "data A" so as to create encrypted digital data "E (KM, dataA)". When the digital data "dataA" is to be recorded on another recording medium and an encryption key "K'M" is created according to the inherent information of the other recording medium, the encrypted digital data "E" is encrypted digital data "E(K'M, dataA)".

The technology of digital data encryption is described in Japanese Laid-Open Patent Application No. 05-257816. The recording unit 3108 records the encrypted digital data that has been received from the encryption unit 3107 on the recording medium 3102. At this time, the recording unit 3108 creates the management information of the recorded digital data on the recording medium 3102.

FIG. 18 shows an example of management information. Management information 3301 includes title codes 3204, which are the identifiers of the recorded digital data, recording start addresses 3302 of the recorded digital data, and recording end addresses 3303 of the recorded digital data. In the management information 3301, each of the title codes 3204 correspond to different recording start addresses 3302, and recording end addresses 3303.

The management information 3301 is referred to when digital data recorded on the recording medium 3102 is to be reproduced.

When the recording unit 3108 finishes recording the encrypted digital data and the management information on the recording medium 3102, the recording unit 3108 reads the attribute information 3201 that has been stored in the received data record/judging unit 3103 corresponding to the recorded digital data, and writes the read attribute information 3201 on the recording medium 3102. In addition, the recording unit 3108 informs the received data record/judging unit 3103 of the completion of the copying, and informs the accounting information recording unit 3109 of the title code of the recorded digital data.

When the accounting information recording unit 3109 is informed of the title code 3204 by the recording unit 3108, the accounting information recording unit 3109 reads the recording charge 3205 of the attribute information 3201 corresponding to the title code 3204 that has been stored in the received data record/judging unit 3103. When the accounting information recording unit 3109 determines that the recording charge 3205 must be paid, the accounting information recording unit 3109 records the title code 3204 and the recording charge 3205 on the accounting information recording medium 3110 as the accounting information.

The accounting information recording medium 3110 is composed of a RAM card and the like. The accounting information of the digital data that has been downloaded on the recording medium 3102 is recorded by the accounting information recording unit 3109 on the accounting information recording medium 3110.

When the accounting unit 3101 receives an inquiry of a charge from the accounting center (not illustrated) via the communication unit 3101, the accounting unit 3111 reads outstanding accounting information that has been recorded on the accounting information recording medium 3110, and informs the communication unit 3101 of the read outstanding accounting information. After informing the communication unit 3101 of the outstanding accounting information, the accounting unit 3111 records a flag indicating that the accounting center has been informed of the outstanding accounting information (indicating settlement) on the accounting information recording medium 3110.

Figure 19:
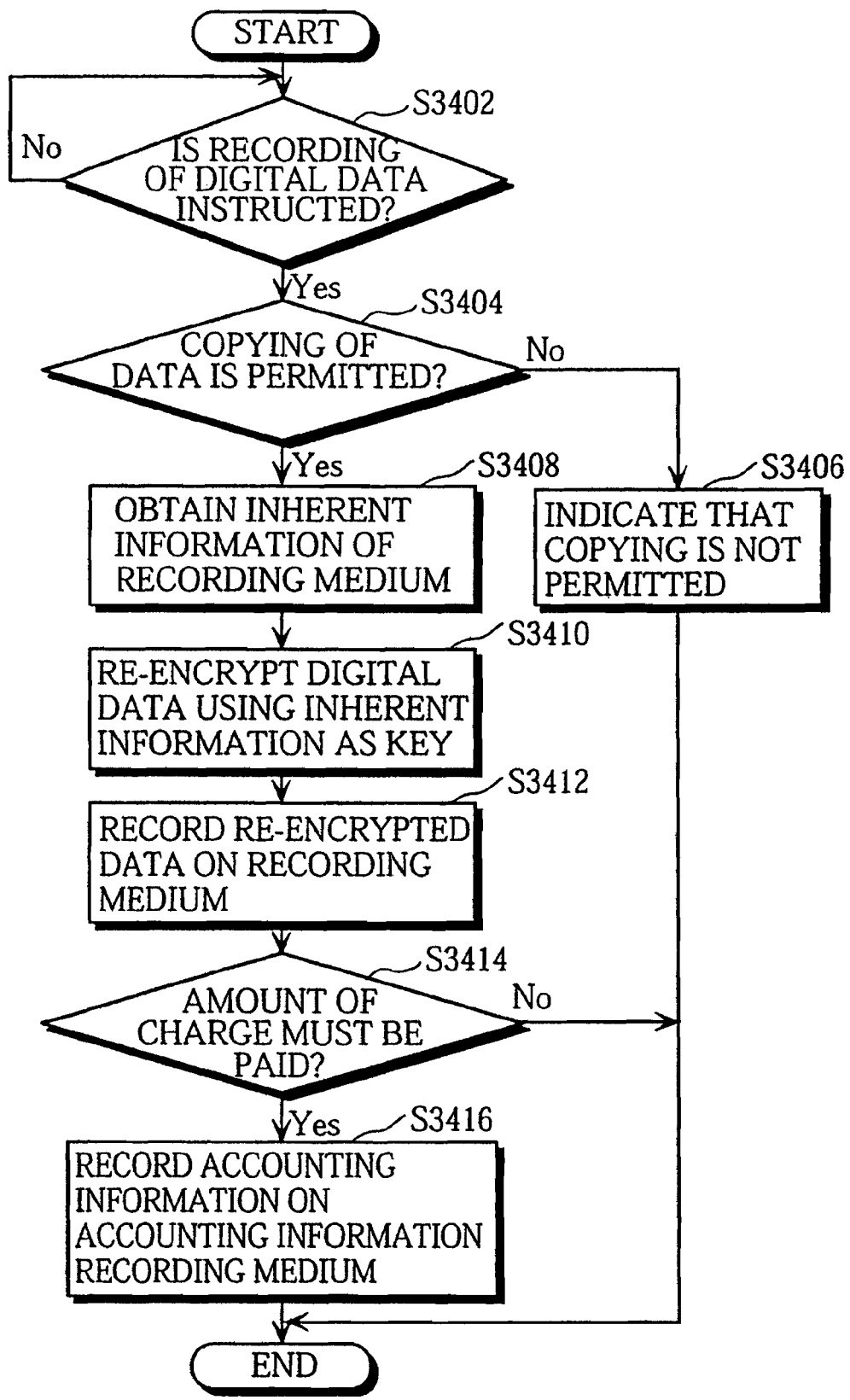
FIG. 19 is a flowchart showing operations in the sixth embodiment.

Here, an explanation of operations in the sixth embodiment will be given with reference to the flowchart in FIG. 19.

The received data record/judging unit 3103 waits for an indication to record digital data from the user (step s3402), and determines whether it is permitted to copy the designated digital data by referring to the attribute information 201 (step s3404). When the received data record/judging unit 3103 is not permitted to copy the digital data, the received data record/judging unit 3103 has the display unit 3104 indicate that the copying is not permitted (step s3406), and then, the processing is completed.

When the received data record/judging unit 3103 is permitted to copy the digital data, the recording medium inherent information obtaining unit 3106 obtains the inherent information of the recording medium 3102 that has been recorded in a secure area on the recording medium 3102, and informs the encryption unit 3107 of the obtained inherent information (step s3408).

The encryption unit 3107 creates an encryption key according to the inherent information, and re-encrypts the digital data (step s3410).

The recording unit 3108 records the encrypted digital data on the recording medium 3102 (step s3412).

Then, the accounting information recording unit 3109 determines whether the recording charge of the recorded digital data must be paid (step s3414). When the recording charge is free, the processing is completed. When the recording charge must be paid, the accounting information recording unit 3109 records the accounting information on the accounting information recording medium 3110 (step s3416) so as to complete the processing.

Figure 20:
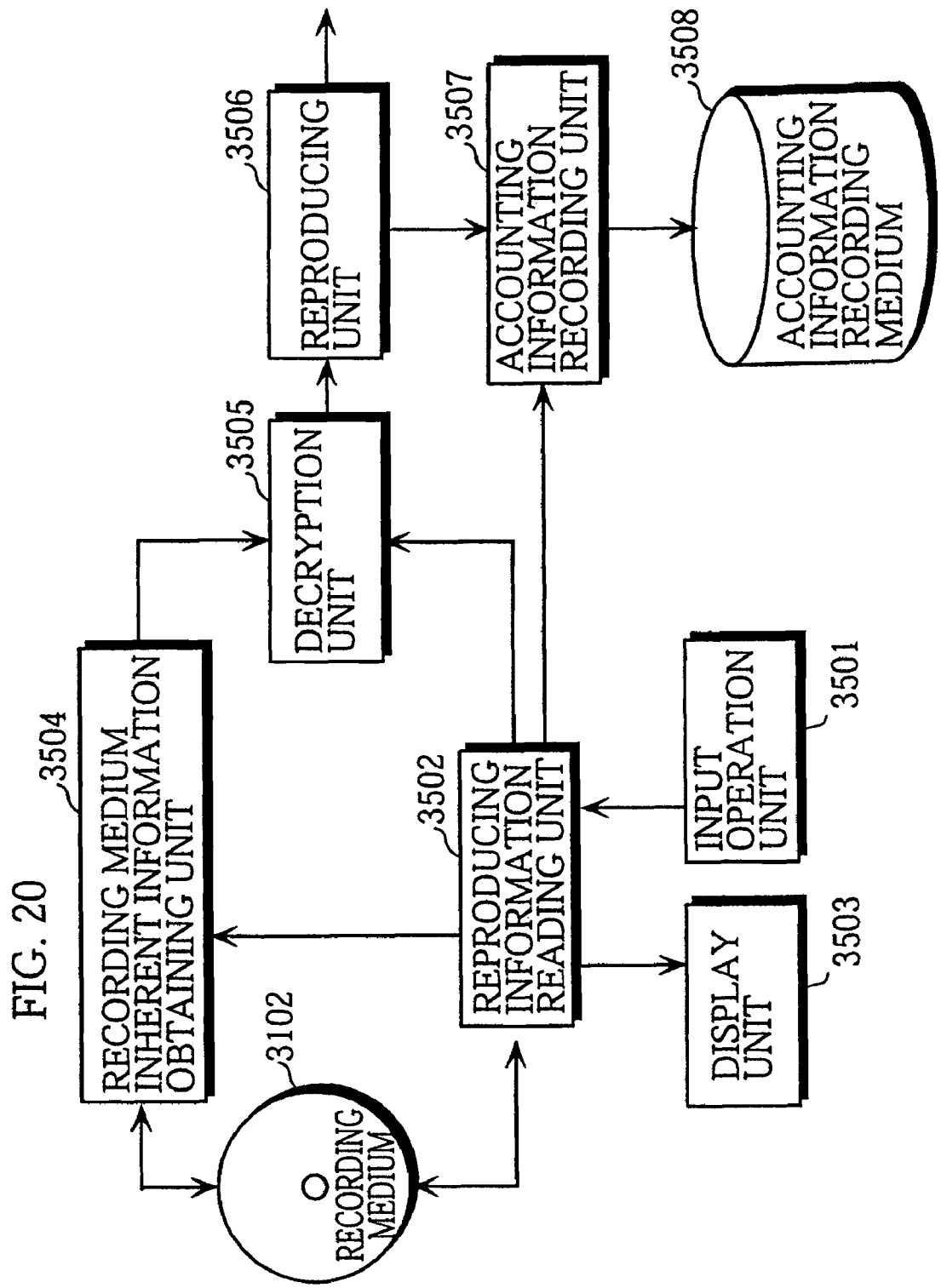
FIG. 20 shows the structure of a playback apparatus for reproducing digital data that has been recorded in the sixth embodiment.

FIG. 20 shows the structure of a playback apparatus for reproducing digital data that has been recorded on the recording medium 3102 by the digital data recording apparatus of the sixth embodiment.

The digital data playback apparatus of the sixth embodiment includes a recording medium 3102, an input operation unit 3501, a reproducing information reading unit 3502, a display unit 3503, a recording medium inherent information obtaining unit 3504, a decryption unit 3505, a reproducing unit 3506, an accounting information recording unit 3507, and an accounting information recording medium 3508.

The digital data that has been re-encrypted in the digital data recording apparatus, the management information 3301, the attribute information 3201, and the inherent information for identifying the recording medium 3102 has been recorded on the recording medium 3102.

When the input operation unit 3501 receives an instruction to start reproducing, the input operation unit 3501 provides the reproducing information reading unit 3502 with an instruction of initial activation. When the input operation unit 3501 receives the designation of a title from the user, the input operation unit 3501 informs the reproducing information reading unit 3502 of the title. Note that an instruction of an automatic playback mode is given to the reproducing information reading unit 3502 not only when the initial activation is instructed but also when the recording medium 3102 is inserted into the digital data playback apparatus.

When the reproducing information unit 3502 receives the instruction of the initial activation, the reproducing information reading unit 3502 reads the attribute information 3201 that has been recorded on the recording medium 3102, and causes the display unit 3503 to display items in the attribute information 3201 such as the titles 3202 and players 3203.

When the reproducing information reading unit 3502 receives the instruction of a piece of music or the instruction of the automatic playback mode from the input operation unit 3501, the reproducing information reading unit 3502 determines whether the maximum number of reproducing 3207 in the attribute information 3201 is equal to or greater than "1". When the maximum number of reproducing 3207 is equal to or greater than "1", the reproducing information reading unit 3502 reads the title code 3204 and the encrypted digital data that has been recorded from the recording start address 3302 to the recording end address 3303, and informs the decryption unit 3505 of the read digital data. At this time, the reproducing information reading unit 3502 instructs the recording medium inherent information obtaining unit 3504 to obtain the inherent information, and informs the accounting information recording unit 3507 of the title code 3204 and the charge per reproduction. Then, when the digital data has been read by the reproducing information reading unit 3502, the reproducing information reading unit 3502 rewrites the maximum number of reproducing 3207, which is an item of the attribute information 3201, by decreasing the value of the maximum number of reproducing 3207 by one. Note that when the maximum number of reproducing 3207 is "no limit", the maximum number of reproducing 3207 is not rewritten.

When the reproducing information reading unit 3502 determines that the maximum number of reproducing is less than "1", the reproducing information reading unit 3502 causes the display unit 3502 to display that the digital data cannot be reproduced anymore.

The display unit 3503 is composed of a liquid crystal display and the like, and displays the list of titles and other information that have been read by the reproducing information reading unit 3502. In addition, when the user designates a title of the music data that has been reproduced the maximum number of times, the display unit 3503 indicates that the music data cannot be reproduced anymore.

When the recording medium inherent information obtaining unit 3504 is instructed by the reproducing information reading unit 3502 to obtain the inherent information, the recording medium inherent information obtaining unit 3504 obtains the inherent information, which is the identifier of the recording medium 3102, from a secure area on the recording medium 3102, and the recording medium inherent information obtaining unit 3504 informs the decryption unit 3505 of the obtained inherent information.

When the decryption unit 3505 is informed of the inherent information by the recording medium inherent information obtaining unit 3504 and when the decryption unit 3505 receives the encrypted digital data from the reproducing information reading unit 3502, the decryption unit 3505 creates a decryption key according to the inherent information, decrypts the encrypted digital data, and informs the reproducing unit 3506 of the decrypted digital data.

When the reproducing unit 3506 is informed of the decrypted digital data by the decryption unit 3505, the reproducing unit 3506 decodes the digital data to reproduce music. After the reproducing of the music, the reproducing unit 3506 informs the accounting information recording unit 3507 that the reproducing is finished.

When the accounting information recording unit 3506 is informed that the reproducing is finished by the reproducing unit 3506, the accounting information recording unit 3507 records, as the accounting information, the title code 3204 and the charge per reproduction 3206 that have been received from the reproducing information reading unit 3502 and the date of reproduction on the accounting information recording medium 3508. Note that when the charge per reproduction 3206 is "free", the charge per reproduction 3206 is not recorded.

The accounting information recording medium 3508 is composed of a RAM card and the like. The accounting information is recorded on the accounting information recording medium 3508, by the accounting information recording unit 3507.

Figure 21:
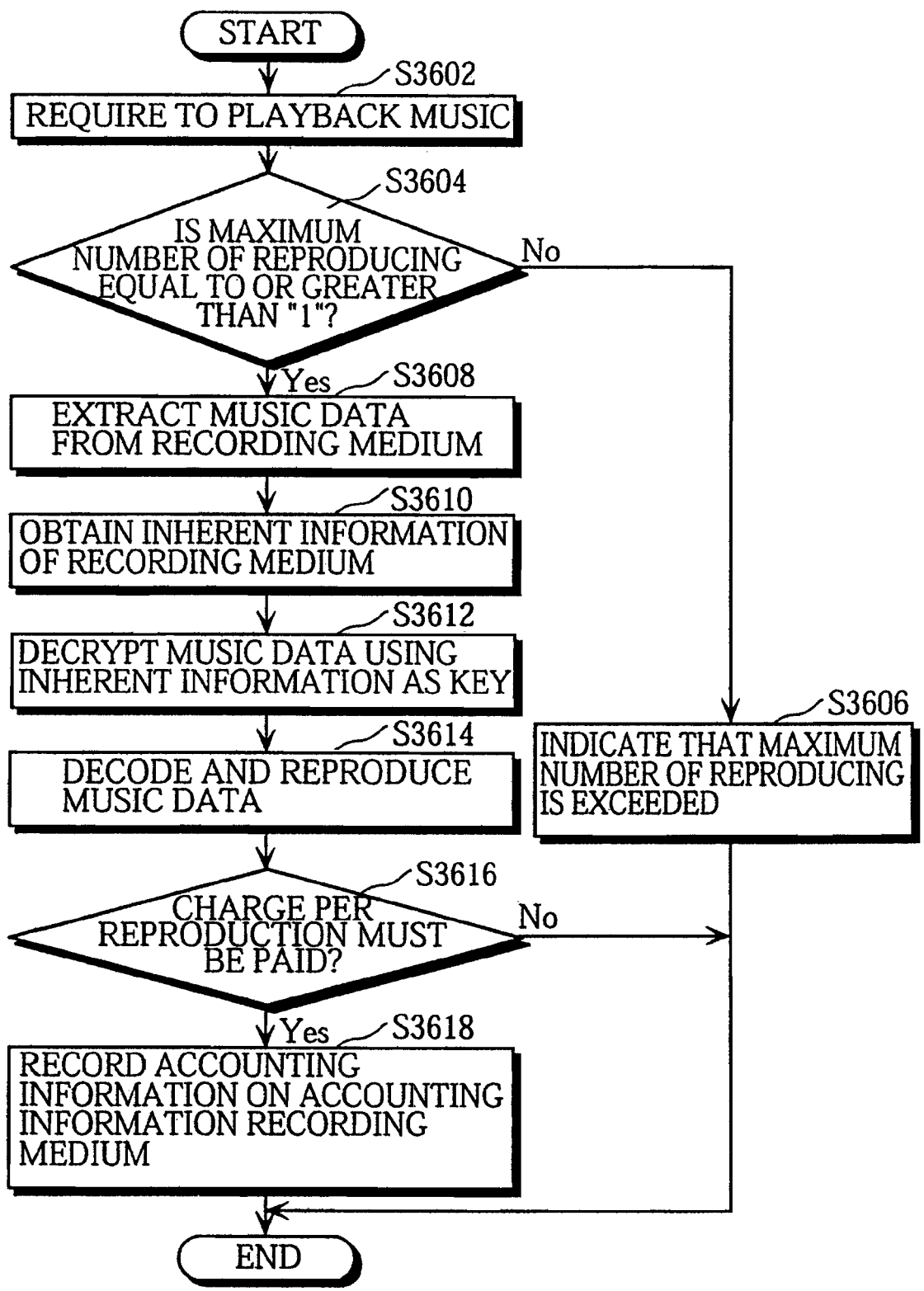
FIG. 21 is a flowchart showing operations by the digital data playback apparatus in the sixth embodiment.

Here, an explanation of operations by the digital data playback apparatus will be given with reference to the flowchart shown in FIG. 21.

First, the user instructs the start of reproduction by using, for instance, a remote control of the input operation unit 3501, and designates a title of music that is displayed by the display unit 3503. The reproducing information reading unit 3502 regards the designation as a requirement to reproduce the music data (digital data) corresponding to the title (step s3602), and determines whether the maximum number of reproducing 3207 of the music is equal to or greater than "1" by referring to the attribute information 3201 (step s3604). When the maximum number of reproducing 3207 is less than "1" the reproducing information reading unit 3502 causes the display unit 3503 to indicate that the music data has been reproduced the maximum number of times (step s3606) to thereby complete the processing.

When the maximum number of reproducing 3207 is equal to or greater than "1", the reproducing information reading unit 3502 reads the encrypted digital data from the recording medium 3102 and informs the decryption unit 3505 of the read digital data (step s3608).

Then, the recording medium inherent information obtaining unit 3504 obtains the inherent information from the recording medium 3102 and informs the decryption unit 3505 of the obtained inherent information (step s3610).

The decryption unit 3505 decrypts the encrypted digital data by using the inherent information as the decryption key (step s3612).

The reproducing unit 3506 decodes the digital data so as to reproduce and output the music (step s3614).

Then, the accounting information recording unit 3507 determines whether the charge per reproduction 3206 must be paid (step s3616). However, when the charge per reproduction 3206 is "free", the processing is completed. When the charge per reproduction 3206 must be paid, the accounting information recording unit 3507 records the accounting information on the accounting information recording medium 3508 (step s3618) to thereby complete the processing.

Seventh Embodiment

Figure 22:
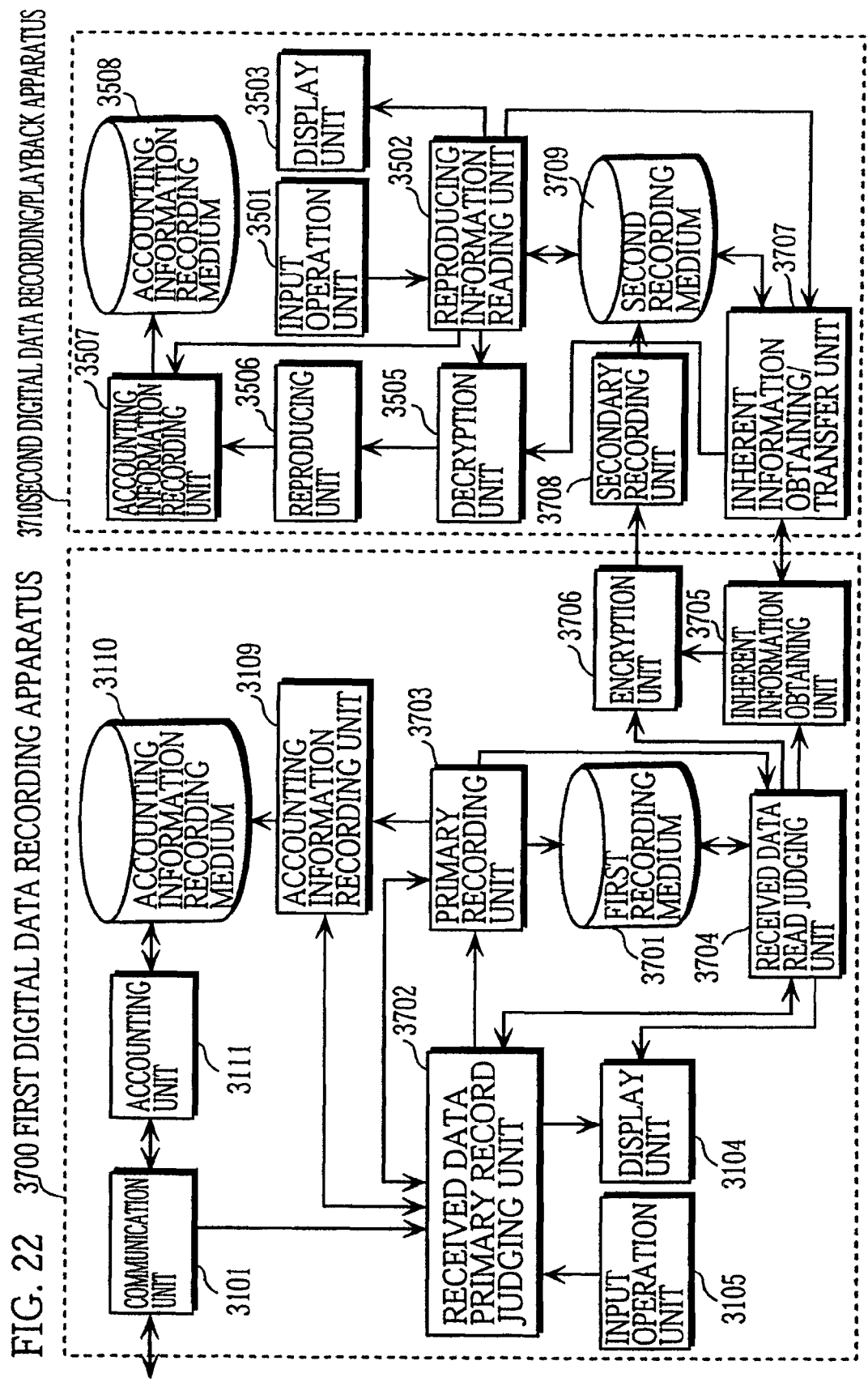
FIG. 22 shows the structure of a digital data recording apparatus according to a seventh embodiment of the present invention.

FIG. 22 shows the structure of a digital data recording apparatus according to a seventh embodiment of the present invention. The digital data recording apparatus of the seventh embodiment includes a first digital data recording apparatus 3700 and a second digital data recording/playback apparatus 3710.

The first digital data recording apparatus 3700 includes a first recording medium 3701, a communication unit 3101, a received data primary record/judging unit 3702, a display unit 3104, an input operation unit 3105, a primary recording unit 3703, a received data read/judging unit 3704, an inherent information obtaining unit 3705, an encryption unit 3706, an accounting information recording unit 3109, an accounting information recording medium 3110, and an accounting unit 3111. The first digital data recording apparatus 3700 is realized by a PC.

The second digital data recording/playback apparatus 3710 includes an inherent information obtaining/transfer unit 3707, a secondary recording unit 3708, a second recording medium 3709, an input operation unit 3501, a reproducing information reading unit 3502, a display unit 3503, a decryption unit 3505, a reproducing unit 3506, an accounting information recording unit 3507, and an accounting information recording medium 3508.

Note that the elements of the first digital data recording apparatus 3700 and the second digital data recording/playback apparatus 3710 of the seventh embodiment that are the same in the digital data recording apparatus and the digital data playback apparatus of the sixth embodiment have the same reference numbers and explanations of such elements are not given below.

First, an explanation of the first digital data recording apparatus 3700 will be given. The first digital data recording apparatus 3700 is different from the digital data recording apparatus of the sixth embodiment in that the first recording medium 3701 is fixed in the first digital data recording apparatus 3700, and in that digital data that has been recorded on the first recording medium 3701 is outputted after being encrypted for secondary recording.

The first recording medium 3701 is composed of a rewritable recording element such as a hard disk that is fixed in the first digital data recording apparatus 3700. Digital data (music data) that has been received by the communication unit 3101 and the management information of the digital data are recorded on the first recording medium 3701 by the primary recording unit 3703.

The received data primary record/judging unit 3702 writes attribute data that is attached to the digital data that has been received by the communication unit 3101 in a storage area in an EEPROM. One example of attribute information that is received in the seventh embodiment is shown in FIG. 23. Attribute information 3801 is different from the attribute information 3201 in the sixth embodiment in that secondary recording charges 3802, copy permission (primary) 3803, and copy permission (secondary) are indicated to be a part of the attribute information 3801.

The attribute information 3801 shows that neither the primary nor secondary copying is permitted and that only listening in real time is permitted for a title "music E" having title code "song05".

When the received data primary record/judging unit 3702 receives an instruction for secondary recording of the music by the user, the received data primary record/judging unit 3702 determines whether primary recording is permitted for the music by referring to a copy permission (primary) 3803 item in the attribute information 3801. When the primary recording is not permitted according to the copy permission (primary) 3803 of a particular piece of music, the received data primary record/judging unit 3702 causes the display unit 3104 to indicate that the primary recording for the music is not permitted. On the other hand, when the primary recording is permitted, the received data primary record/judging unit 3702 informs the primary recording unit 3703 of the digital data of the music. Other functions of the received data primary recording judging unit are the same as those of the received data record/judging unit 3103.

The primary recording unit 3703 records the received digital data on the first recording medium 3701. At this time, the management information is also written as in the case of the recording unit 3108 of the sixth embodiment. Note that while an encryption key is created according to the inherent information of the recording medium 3102 so as to re-encrypt the digital data in the sixth embodiment, the digital data is not re-encrypted in the seventh embodiment since the first recording medium 3701 is not removable from the first digital data recording apparatus 3700, i.e., the first recording medium is not used in another apparatus in the seventh embodiment.

In addition, when the digital data has been recorded on the first recording medium 3701, the primary recording unit 3703 informs the received data read/judging unit 3704 of the title code 3805 of the recorded digital data.

When the received data read/judging unit 3704 is informed of the title code 3805 by the primary recording unit 3703, the received data read/judging unit 3704 determines whether the secondary recording of the music is permitted by referring to the copy permission (secondary) 3804 in the attribute information 3801 in the received data primary record/judging unit 3702. When the secondary recording is not permitted, or when the permitted number of times that the data can be recorded is less than "1", the received data read/judging unit 3704 causes the display unit 3104 to indicate that the secondary recording is not permitted for the music.

When the secondary recording is permitted, the received data read/judging unit 3704 refers to the management information (refer to FIG. 18), and reads the digital data of the title code that has been recorded on the first recording medium 3701. The received data read/judging unit 3704 informs the encryption unit 3706 of the digital data, and instructs the inherent information obtaining unit 3705 to obtain inherent information.

When the received data read/judging unit 3704 reads the digital data, the received data read/judging unit 3704 decreases the number of times of the copy permission (secondary) 3804 by "1" in the attribute information 3701 that has been stored in the received data primary record/judging unit 3702. For instance, "only once" is changed to "not permitted", and "permitted" is not written since the number of times is not limited.

Note that after the received data read/judging unit 3704 notifies the encryption unit 3706 of the digital data, the received data read/judging unit 3704 reads the attribute information that has been stored in the received data primary record/judging unit 3702.

When the inherent information obtaining unit 3705 is instructed to obtain inherent information by the received data read/judging unit 3704, the inherent information obtaining unit 3705 requests the inherent information obtaining/transfer unit 3707 in the second digital data recording/playback apparatus 3710, which is connected to the first digital data recording apparatus 3700, to transmit the inherent information. When the inherent information obtaining unit 3705 is informed of the inherent information by the inherent information obtaining/transfer unit 3707, the inherent information obtaining unit 3705 informs the encryption unit 3706 of the inherent information.

The encryption unit 3706 creates an encryption key according to the inherent information that has been transferred from the inherent information obtaining unit 3705, encrypts the digital data that has been transferred from the received data read/judging unit 3704, and transmits the encrypted digital data to the secondary recording unit 3708 in the second digital data recording/playback apparatus 3710. After the transmission of the encrypted digital data, the encryption unit 3706 transmits the received attribute information to the secondary recording unit 3708.

Here, an explanation of the second digital data recording/playback apparatus 3710 will be given. The second digital data recording/playback apparatus 3710 is realized by, for instance, a portable headphone stereo apparatus. The second recording medium 3709 is composed of a semiconductor memory such as an IC card that is removable from the second digital data recording/playback apparatus 3710.

When the inherent information obtaining/transfer unit 3707 is required by the inherent information obtaining unit 3705 in the first digital data recording apparatus 3700 to transmit the inherent information, the inherent information obtaining/transfer unit 3707 obtains the medium identification information which is inherent in the second recording medium 3709 that is recorded on the second recording medium 3709 in advance and the apparatus identification information which is inherent in the second digital data recording/playback apparatus 3710, and the inherent information obtaining/transfer unit 3707 informs the inherent information obtaining unit 3705 of the obtained medium identification information and the apparatus identification information. Meanwhile, when the inherent information obtaining/transfer unit 3707 is instructed to inform of the inherent information by the reproducing information reading unit 3502, the inherent information obtaining/transfer unit 3707 informs the decryption unit 3505 of the obtained medium identification information and the apparatus identification information.

When the secondary recording unit 3708 receives the encrypted digital data and the attribute information that has been output from the encryption unit 3706 in the first digital data recording apparatus 3700, the secondary recording unit 3708 records the received encrypted digital data and the attribute information on the second recording medium 3709. In addition, the secondary recording unit 3708 records the management information 3301 shown in FIG. 18 on the second recording medium 3709. The decryption unit 3505 creates a decryption key according to the medium identification information and the apparatus identification information that have been transferred from the inherent information obtaining/transfer unit 3707, and decrypts the encrypted digital data that has been transferred from the reproducing information reading unit 3502 by using the created decryption key. Note that the other parts of the structure of the second digital data recording/playback apparatus 3710 are almost the same as those of the digital data playback apparatus of the sixth embodiment.

Here, an explanation will be given when the second recording medium 3709 is composed of an IC card that is fixed in the second digital data recording/playback apparatus 3710. In this case, since the second recording medium 3709 is only used in the second digital data recording/playback apparatus 3710, the inherent information obtaining/transfer unit 3707 does not obtain any medium identification information, and informs the inherent information obtaining unit 3705 of the apparatus identification information that the inherent information obtaining/transfer unit 3707 stores. Meanwhile, the inherent information obtaining/transfer unit 3707 informs the decryption unit 3505 of the apparatus identification information.

As has been described, it depends on whether the second recording medium 3709 in the second digital data recording/playback apparatus 3710 is removable as to whether an encryption key for encrypting the digital data is created according to either the combination of the medium identification information and the apparatus identification information or the apparatus identification information. By doing so, an unauthorized duplication and reproduction of digital data can be prevented.

Here, an explanation of operations in the seventh embodiment will be given with reference to the flowchart shown in FIG. 24.

First, the received data primary record/judging unit 3702 waits for an instruction of the secondary recording of digital data from the input operation unit 3105 (step s3902), and determines whether the primary recording of the digital data is permitted by referring to the attribute information 3801 (step s3904). When the primary recording is not permitted, the received data primary record/judging unit 3702 causes the display unit 3104 to indicate that the primary recording is not permitted (step s3906) so as to complete the processing.

When the primary recording is permitted, the received data primary record/judging unit 3702 informs the primary recording unit 3703 of the digital data. The primary recording unit 3703 records the digital data and the management information on the first recording medium 3701 (step s3908).

Next, the accounting information recording unit 3109 determines whether the primary recording is charged or not (step s3910), and records the accounting information on the accounting information recording medium 3110 when the primary recording is charged (step s3912).

Then, the received data read/judging unit 3704 determines whether the secondary recording of the digital data that has been recorded on the first recording medium 3701 is permitted by referring to the attribute information 3801 that has been stored in the received data primary record/judging unit 3702 (step s3914). When the secondary recording is not permitted, the received data read/judging unit 3704 causes the display unit 3104 to indicate that the secondary recording is not permitted (step s3916) so as to complete the processing.

When the secondary recording is permitted, the received data read/judging unit 3704 reads the digital data from the first recording medium 3701, informs the encryption unit 3706 of the read digital data, and instructs the inherent information obtaining unit 3705 to obtain the inherent information from inherent information obtaining/transfer unit 3707 of the second digital data recording playback apparatus 3710. The inherent information obtaining unit 3705 obtains the inherent information, and informs the encryption unit 3706 of the obtained inherent information (step s3918). The encryption unit 3706 creates an encryption key according to the received inherent information (step s3920), encrypts the received digital data by using the created encryption key, and outputs the encrypted digital data to the secondary recording unit 3708 in the second digital data recording/playback apparatus 3710.

The secondary recording unit 3708 records the encrypted digital data, the attribute information and the management information on the secondary recording medium 3709 (step s3922).

The accounting information recording unit 3109 determines whether the secondary recording is charged (step s3924), and records the accounting information on the accounting information recording medium 3110 when the secondary recording is charged (step s3926) so as to complete the processing.

Note that the operations in reproducing the digital data by the second digital data recording/playback apparatus 3710 are almost the same as the operations by the digital data playback apparatus of the sixth embodiment, and therefore, an explanation thereof will be given.

An Other Example of the Seventh Embodiment

While the digital data is encrypted in the seventh embodiment by using the encryption key according to the combination of the apparatus identification information of the second digital data recording/playback apparatus 3710 and the medium identification information of the second recording medium 3709 when the second recording medium 3709 is removable, the form of encryption is designated by the user (that is, it is designated by the user whether the encryption key is created according to only the medium identification information or the combination of the medium identification information and the apparatus identification information) so as to increase the degree of freedom of usage patterns in this another example of the seventh embodiment. More specifically, when the digital data is reproduced with the second digital data recording/playback apparatus 3710, the digital data of music that has been recorded on the second recording medium 3709 is encrypted by using the medium identification information and the apparatus identification information at the time of recording. On the other hand, when the digital data is reproduced with another digital data playback apparatus (an apparatus that decrypts encrypted digital data by using the medium identification information as the decryption key), the digital data is encrypted by using the medium identification information at the time of recording. As a result, the form of encryption can be selected according to the usage pattern.

On the other hand, the secondary recording charges are determined according to the degree of freedom of usage pattern so as to protect the copyright.

Here, an explanation of the structure of the first digital data recording apparatus and the second digital data recording/playback apparatus in the another example of the seventh embodiment will be given. Note that the functions of the first digital data recording apparatus and the second digital data recording/playback apparatus in this example are realized by adding a few functions to those of the first digital data recording apparatus 3700 shown in FIG. 22. As a result, an explanation of only the parts of the structure that are different from the seventh embodiment will be given with reference to FIG. 22, which has been used in the explanation of the seventh embodiment.

FIG. 25 shows a part of attribute information 31001 that is stored in the received data primary record/judging unit 3702. The attribute information 31001 is different from the attribute information 3801 shown in FIG. 23 with regard to the contents of the secondary recording charges 3802 and secondary recording charges 31002.

A secondary recording charge 31002 depends on whether the encryption key that is used in the encryption of the digital data is created according to the medium identification information (medium ID) 31003, the apparatus identification information (apparatus ID) 31004, or the combination of the medium identification information and the apparatus identification information. When the encryption key has been created according to the medium identification information 31003, the music data can be reproduced by using the second recording medium 3709 in another apparatus and the degree of freedom of the user is increased. As a result, the secondary recording charge (secondary replication charge) is higher than when the encryption key has been created according to the apparatus identification information 31004 and the combination of the medium identification information and the apparatus identification information 31005. By doing so, the replication charge is determined according to the usage pattern.

When the inherent information obtaining unit is informed of the apparatus identification information and the medium identification information by the inherent information obtaining/transfer unit 3707, the inherent information obtaining unit 3705 causes the display unit 3104 to indicate whether the second recording medium 3709 is used in the second digital data recording/playback apparatus 3710 or in another apparatus to wait for the user selection.

The user designates the second digital data recording/playback apparatus 3710 or another apparatus by using the input operation unit 3501, i.e., to create the encryption key according to the medium identification information or to create the encryption key according to the combination of the medium identification information and the apparatus identification information.

The input operation unit 3501 informs the received data primary record/judging unit 3702 of the user's designation.

When the received data primary record/judging unit 3702 is informed by the input operation unit 3105 that another apparatus is to be used, the received data primary record/judging unit 3702 informs the accounting information recording unit 3109 that the secondary recording charge 31002 is determined according to the encryption key that is created by using the medium identification information 31003. On the other hand, when the received data primary record/judging unit 3702 is informed that only the second digital data recording/playback apparatus is to be used, the received data primary record/judging unit 3702 informs the accounting information recording unit 3109 that the secondary recording charge 31002 is determined according to the encryption key that is created by using the combination of the medium identification information and the apparatus identification information 31005.

When the received data primary record/judging unit 3702 is informed by the input operation unit 3501 that another apparatus is to be used, the inherent information obtaining unit 3705 informs the encryption unit 3706 of only the medium identification information 31003. On the other hand, when the received data primary record/judging unit 3702 informed by the input operation unit 3501 that only the second digital data recording/playback apparatus 3710 is to be used, the inherent information obtaining unit 3705 informs the encryption unit 3706 of the combination of the medium identification information and the apparatus identification information 31005.

When the accounting information recording unit 3109 is informed by the encryption unit 3706 that the encrypted digital data has been transmitted to the secondary recording unit 3708, the accounting information recording unit 3109 refers to the secondary recording charge 31002 in the attribute information 31001 that the accounting information recording unit 3109 has been informed of by the received data primary record/judging unit 3702, and the accounting information recording unit 3105 records the accounting information on the accounting information recording medium 3110.

Note that, while it is needless to say, when the second recording medium 3709 is a removable DVD-RAM in this example, the encryption key can be created only according to the identification information which is inherent to the DVD-RAM, the digital data can be re-encrypted by using the created encryption key, and the re-encrypted digital data can be recorded as in the case of the sixth embodiment.

Meanwhile, operations in this example are essentially the same as those in the seventh embodiment, and therefore, an explanation thereof will not be given.

Note that it is possible to suppose that the accounting information recording media 3110 and 3508 are realized by IC cards, for instance, and that the digital data is not recorded and reproduced without setting the IC cards in the sixth and seventh embodiments and in this example.

In addition, while the digital data that is received by the communication unit 3110 has been supposed to be music data in the sixth and seventh embodiments and in this example, the digital data can be video data, audio data, character data, and the combination of those types of data.

While the structures of the digital data recording apparatus, the digital data playback apparatus, and the digital data recording/playback apparatus are shown in FIGS. 16, 20 and 22, it is possible to record a program which realizes the functions of the elements on a computer-readable recording medium such as a floppy disk, to use the computer-readable recording medium in a digital data recording/playback apparatus that has no function of protecting copyrights, and to have the digital data recording/playback apparatus have a function of protecting copyrights.

Although the present invention has been fully described by way of examples with reference to the accompanying drawings, it is to be noted that various changes and modifications will be apparent to those skilled in the art. Therefore, unless such changes and modifications depart from the scope of the present invention, they should by construed as being included therein.

What is claimed:

1. A digital data recording apparatus for recording digital data on a recording medium, the digital data recorded on the recording medium being reproducible by a playback apparatus and the recording medium being either removable or non-removable from the playback apparatus, said digital data recording apparatus comprising:
 a communication unit to receive encrypted digital data via a digital network;
 a decryption unit to decrypt the encrypted digital data received by said communication unit;
 an encryption unit including a plurality of encryption sub-units each of which is to encrypt digital data obtained by said decryption unit, by using a selected one of a plurality of encryption methods having different security levels;
 a recording unit to record, on the recording medium, encrypted digital data that is obtained by said encryption unit; and
 a judging unit to judge whether the recording medium is removable or non-removable from the playback apparatus, wherein
 said plurality of encryption sub-units include first and second encryption sub-units,
 the first encryption sub-unit is to perform the encryption when the recording medium is judged to be removable from the playback apparatus, and
 the second encryption sub-unit is to perform the encryption when the recording medium is judged to be non-removable.

2. The digital data recording apparatus according to claim 1, wherein
 said first encryption sub-unit is to perform the encryption by using an encryption key that is created according to identification information of the recording medium, and
 said second encryption-sub unit is to perform the encryption by using an encryption key that is created according to identification information of the playback apparatus.

3. The digital data recording apparatus according to claim 1, further comprising
 an accounting unit to determine an accounting value according to the selection of said one of said plurality of encryption sub-units and to conduct an accounting process according to the determined accounting value.

4. The digital data recording apparatus according to claim 1, wherein
 the security levels of the encryption methods used by said plurality of encryption sub-units are lower than a security level of an encryption method used in encryption to obtain the encrypted digital data received by said communication unit.

5. The digital data recording apparatus according to claim 1, wherein
 the encrypted digital data received by said communication unit is obtained by using one of a plurality of encryption methods having different security levels and the encrypted digital data includes attribute information indicating the one of the plurality of encryption methods used for the encryption,
 said decryption unit includes a plurality of decryption sub-units each of which is to decrypt the encrypted digital data that is obtained by using a corresponding one of the plurality of encryption methods and received by the communication unit, and
 said judging unit is to determine the one of the plurality of encryption methods used to obtain the received encrypted digital data according to the attribute information, and to control said decryption unit so that a selected one of said plurality of decryption sub-units corresponding to the determined one of the plurality of encryption methods decrypts the encrypted digital data.

6. The digital data recording apparatus according to claim 5, further comprising
 an accounting unit to determine an accounting value according to the selection of said one of said decryption sub-units and the selection of said one of said encryption sub-units, and to conduct an accounting process according to the determined accounting value.

7. A digital data recording method for recording digital data on a recording medium, the digital data recorded on the recording medium being reproducible by a playback apparatus and the recording medium being either removable or non-removable from the playback apparatus, said digital data recording method comprising:
 a step of receiving encrypted digital data via a digital network;
 a step of decrypting the encrypted digital data received in said receiving step;
 a step of encrypting digital data obtained in said decrypting step, using a selected one of a plurality of encryption methods having different security levels;
 a step of recording, on the recording medium, encrypted digital data that is obtained in said encrypting step; and
 a step of judging whether the recording medium is removable or non-removable from the playback apparatus, wherein
 said encrypting step includes:
  a first encrypting sub-step of encrypting the digital data obtained in said decrypting step, when the recording medium is judged to be removable from the playback apparatus; and
  a second encrypting sub-step of encrypting the digital data obtained in said decrypting step, when the recording medium is judged to be non-removable.

8. A computer-readable program recording medium storing a program for causing a computer to record digital data onto a digital-data recording medium, the digital data recorded on the digital-data recording medium being reproducible by a playback apparatus and the digital-data recording medium being either removable or non-removable from the playback apparatus, said program comprising code operable to cause the computer to perform:
 a step of receiving encrypted digital data via a digital network;
 a step of decrypting the encrypted digital data received in said receiving step;
 a step of encrypting digital data obtained in said decrypting step, using a selected one of a plurality of encryption methods having different security levels;
 a step of recording, on the digital-data recording medium, encrypted digital data that is obtained in said encrypting step; and
 a step of judging whether the digital-data recording medium is removable or non-removable from the playback apparatus, wherein
 said encrypting step includes:
  a first encrypting sub-step of encrypting the digital data obtained in said decrypting step, when the digital-data recording medium is judged to be removable from the playback apparatus; and
  a second encrypting sub-step of encrypting the digital data obtained in said decrypting step, when the digital-data recording medium is judged to be non-removable.

* * * * *